(12) United States Patent
Ritter

(10) Patent No.: US 6,244,018 B1
(45) Date of Patent: Jun. 12, 2001

(54) AIR ASSISTED COLLATOR

(75) Inventor: Mark A. Ritter, Garland, TX (US)

(73) Assignee: Dallas A. C. Horn & Co., Dallas, TX (US)

( * ) Notice: Subject to any disclaimer, the term of this patent is extended or adjusted under 35 U.S.C. 154(b) by 0 days.

(21) Appl. No.: 09/361,549

(22) Filed: Jul. 27, 1999

Related U.S. Application Data

(63) Continuation-in-part of application No. 08/883,843, filed on Jun. 27, 1997, now Pat. No. 5,941,365.

(51) Int. Cl.7 ...................................................... B65B 5/10
(52) U.S. Cl. ................................ 53/244; 53/171; 53/501; 53/537
(58) Field of Search ............................ 53/154, 168, 244, 53/171, 540, 542, 543, 544, 501, 537; 198/347.4, 418.5, 442, 443, 437

(56) References Cited

U.S. PATENT DOCUMENTS

| | | | |
|---|---|---|---|
| 3,664,084 | * 5/1972 | Meckley | 53/244 |
| 4,031,999 | * 6/1977 | Wagner et al. | 198/418 |
| 4,147,248 | * 4/1979 | Kurczak et al. | 198/442 |
| 4,684,118 | * 8/1987 | Boss et al. | 198/347.4 |
| 4,771,589 | * 9/1988 | Mueller et al. | 53/543 |
| 5,369,940 | * 12/1994 | Soloman | 53/501 |
| 5,430,994 | * 7/1995 | Focke et al. | 53/171 |
| 5,441,142 | * 8/1995 | Schneider | 198/442 |
| 5,630,309 | * 5/1997 | Blidung et al. | 198/347.4 |

* cited by examiner

Primary Examiner—Peter Vo
Assistant Examiner—Louis K. Huynh
(74) Attorney, Agent, or Firm—Michael A. O'Neil

(57) ABSTRACT

A collator includes a first conveyor having a discharge end and a second receiving conveyor positioned below the discharge end of the first conveyor. As each product bag falls toward the second conveyor, an air blast assists in uprighting the bag. The second conveyor may be temporarily operated at a high speed to separate the product bags into groups. A deflector may be mounted at the discharge end of the second conveyor for directing product bags into containers.

2 Claims, 41 Drawing Sheets

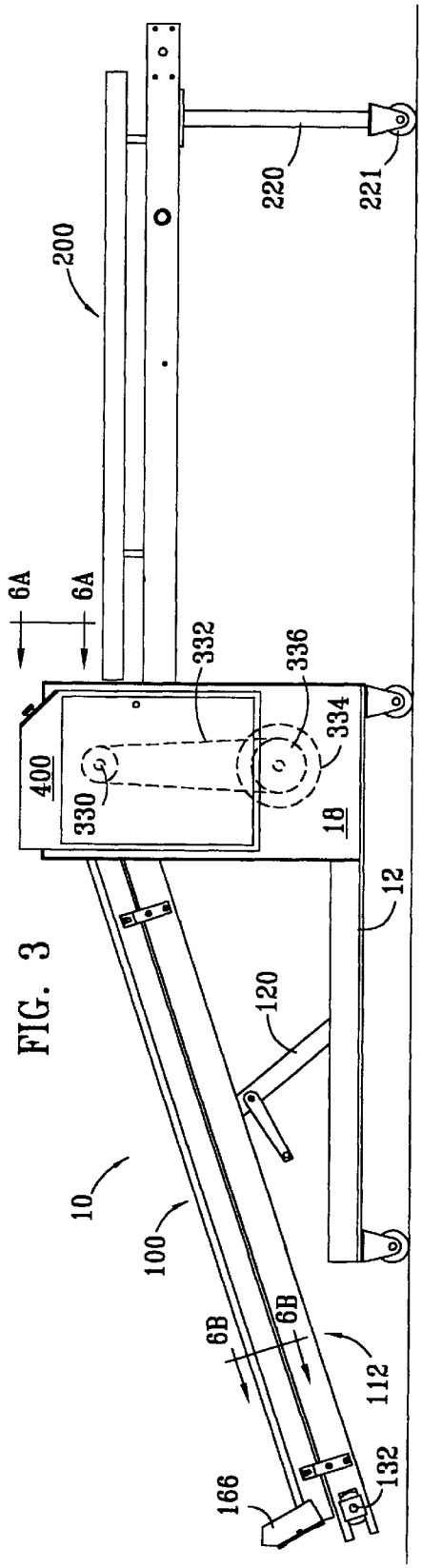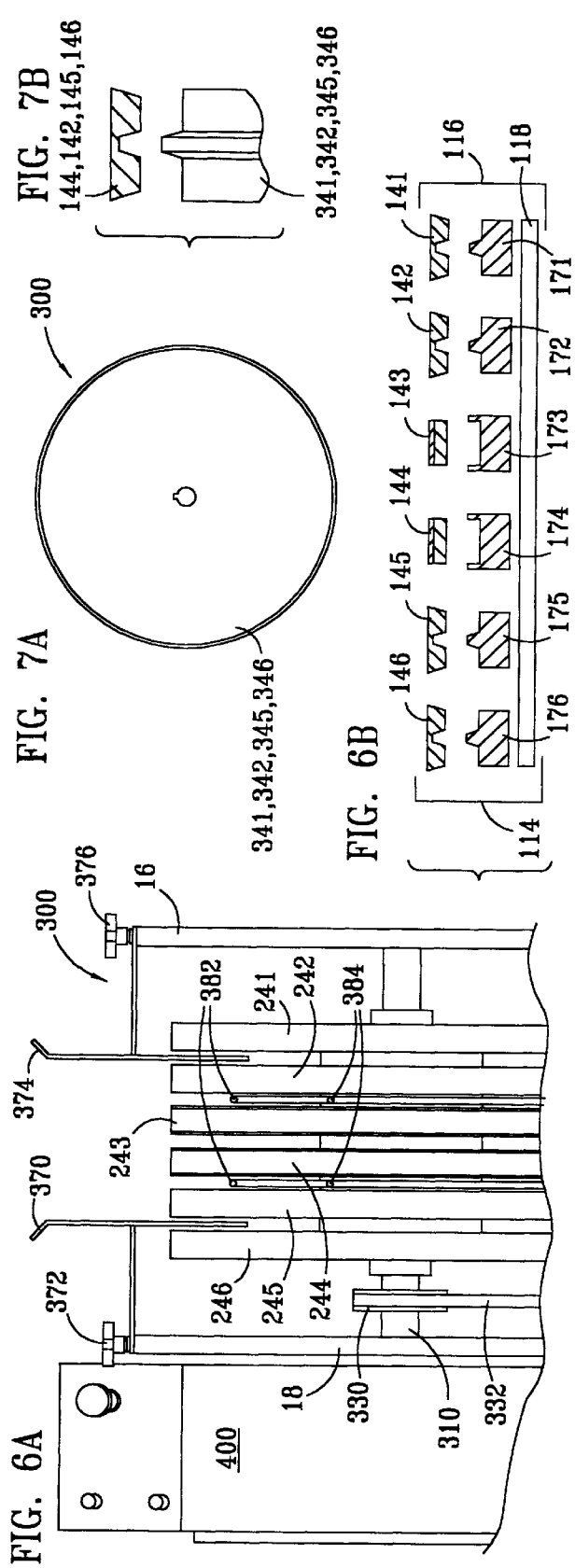

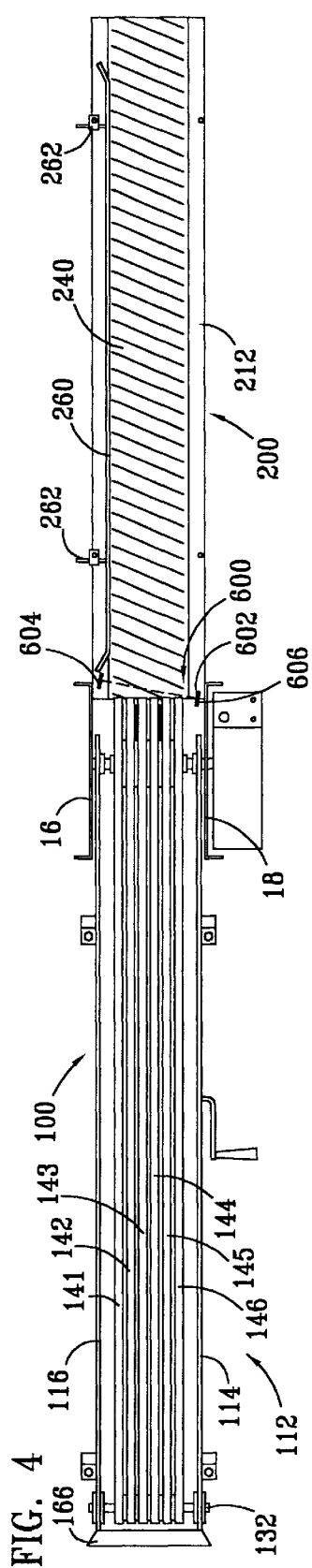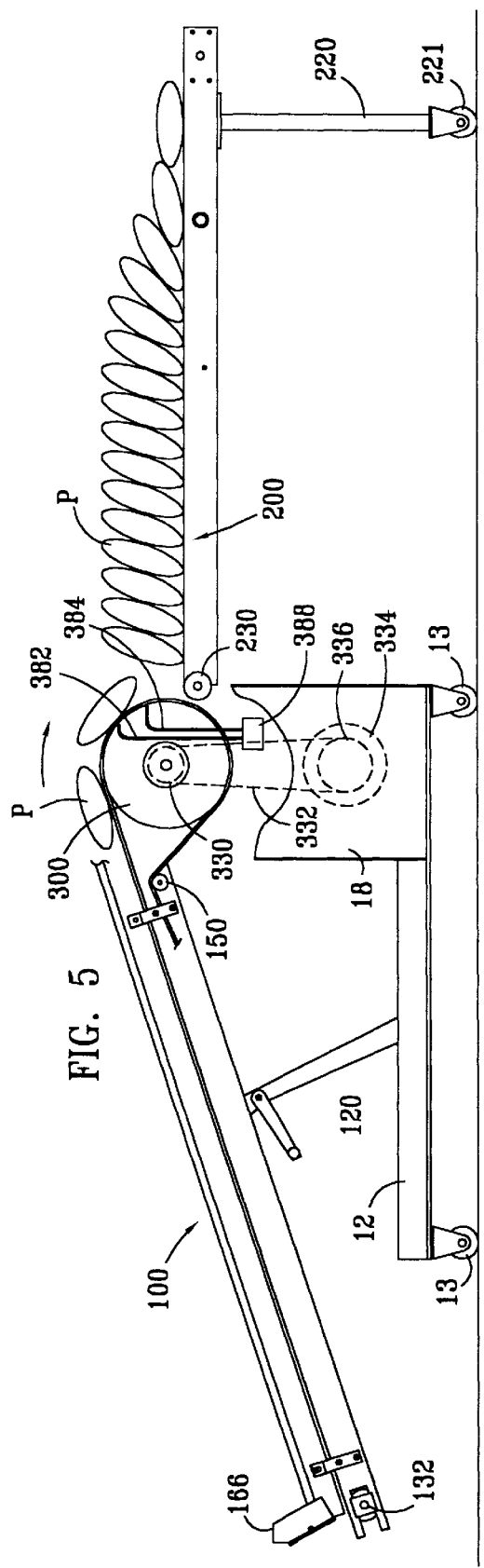

FIG. 7C
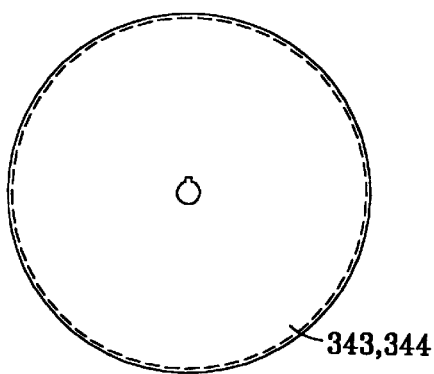
FIG. 7D
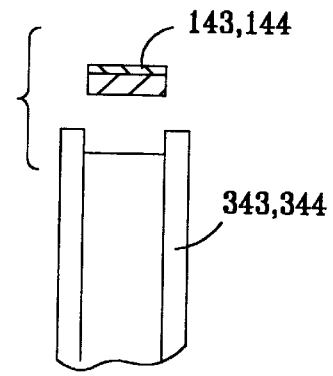
FIG. 8A        FIG. 8B
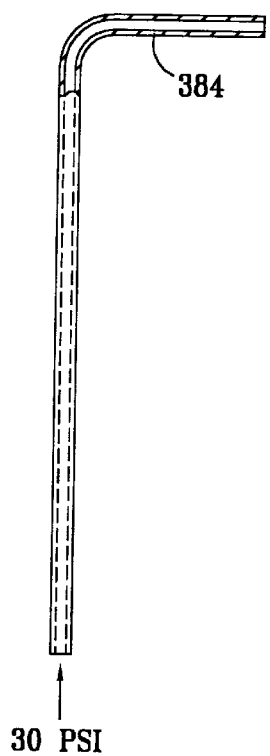
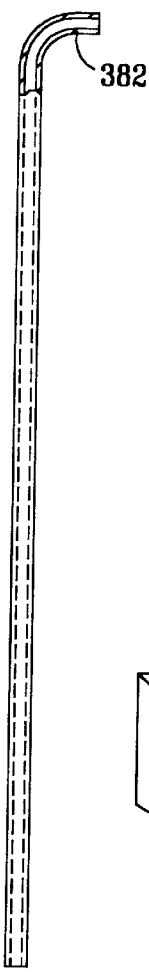
FIG. 9
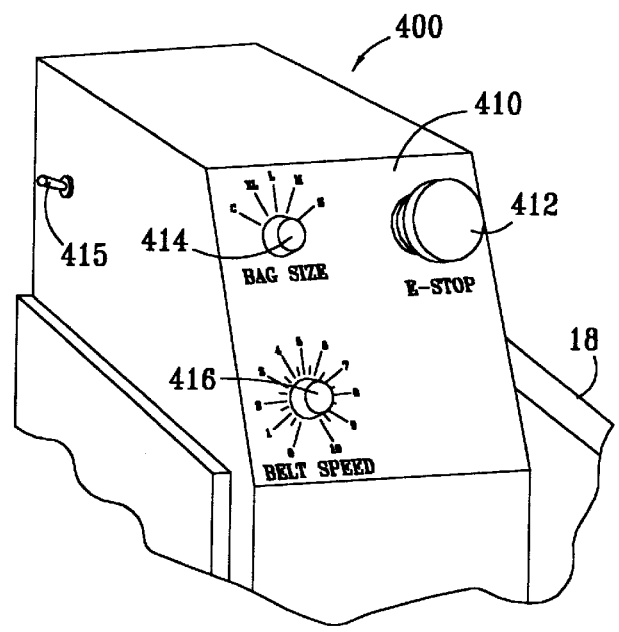

AIR ASSISTED COLLATOR
PROGRAM LISTING
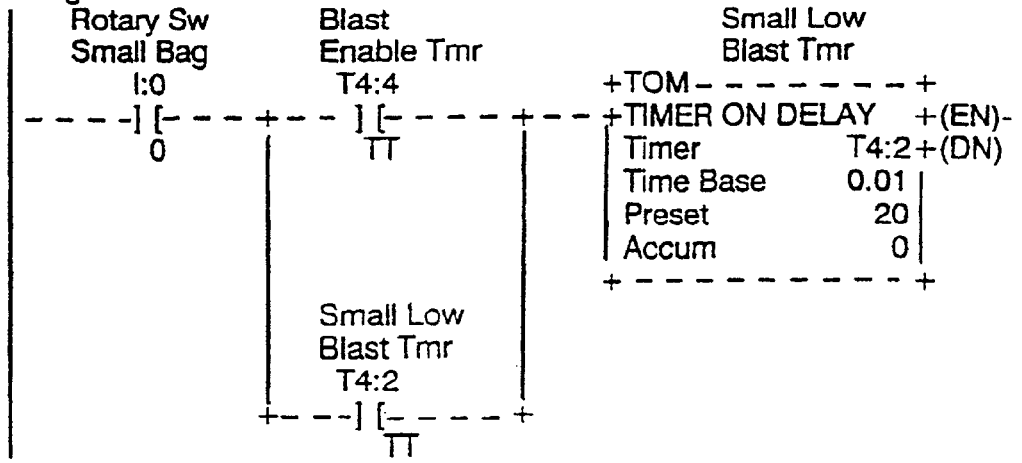
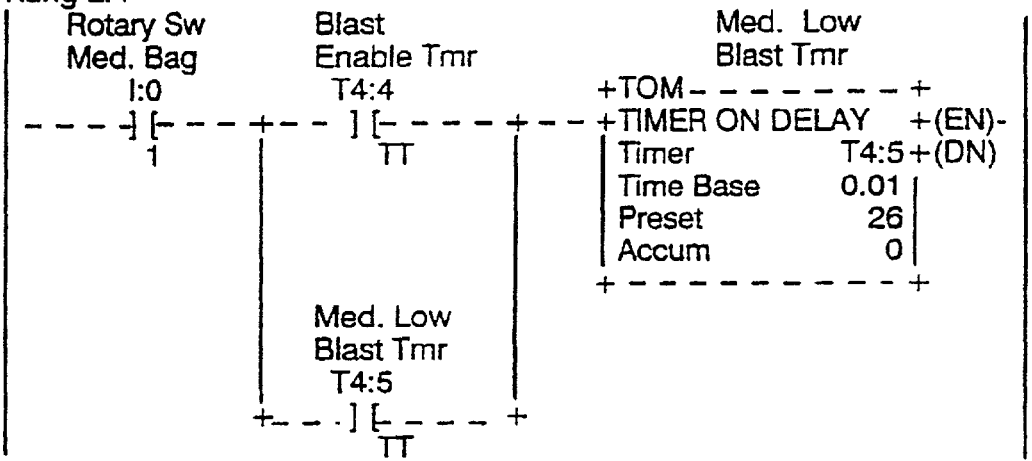
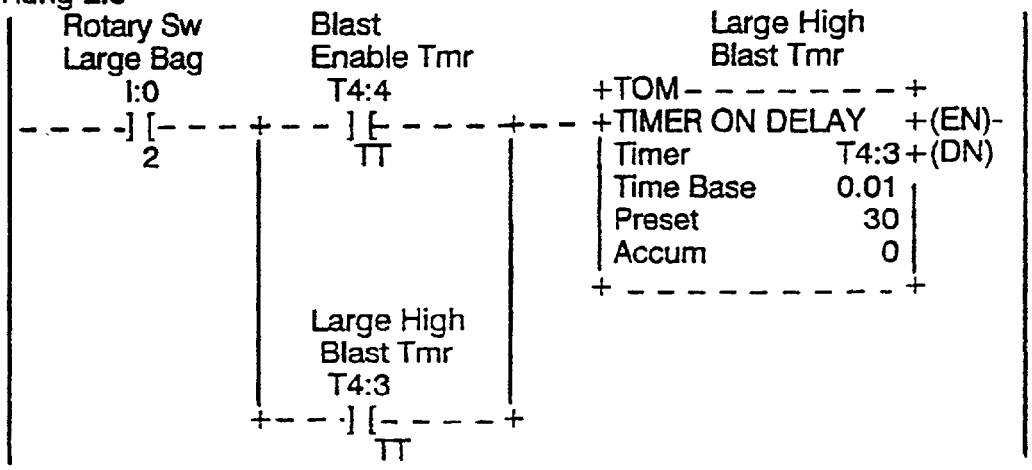
FIG. 12B

AIR ASSISTED COLLATOR PROGRAM LISTING
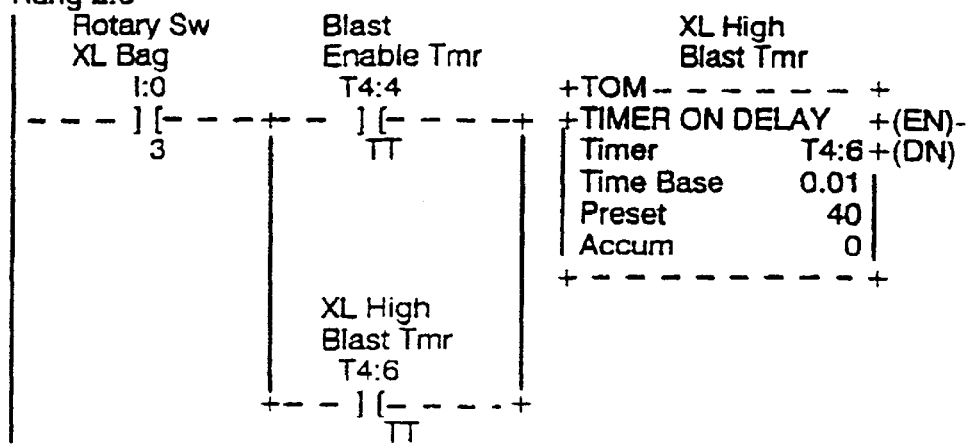
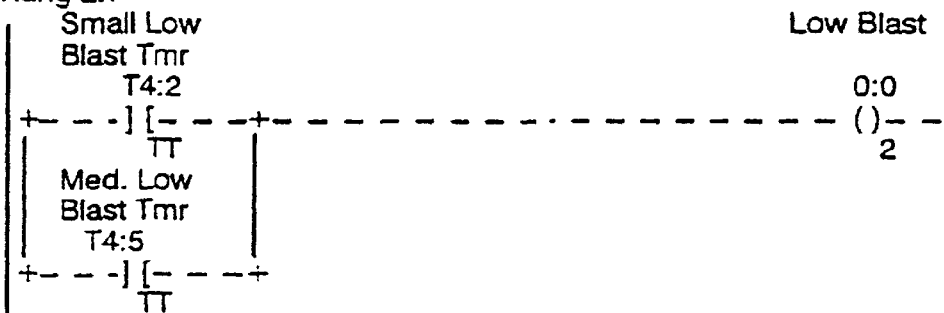
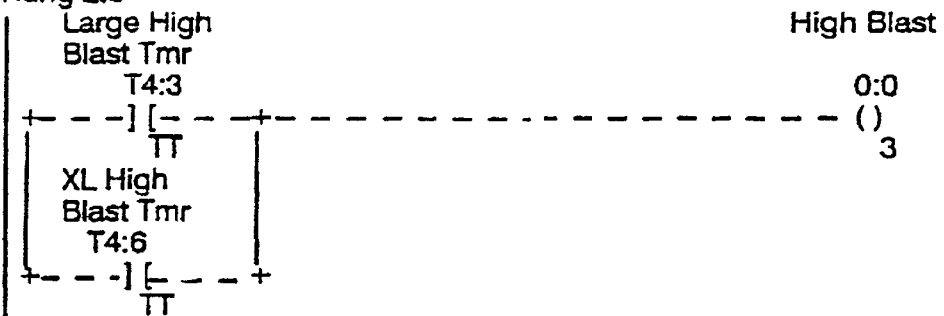
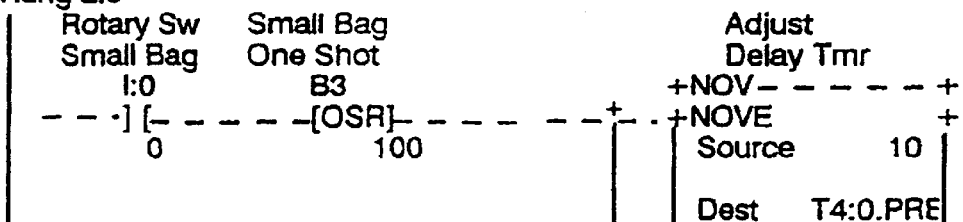
FIG. 12C AIR ASSISTED COLLATOR
PROGRAM LISTING
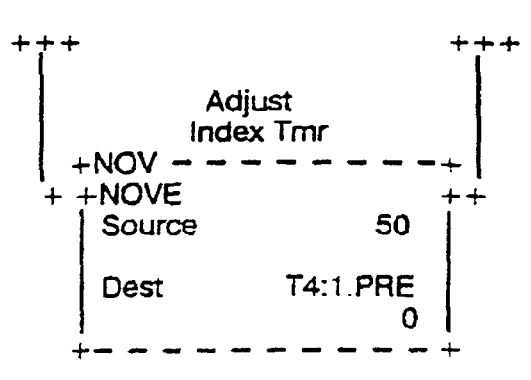
Rung 2:10
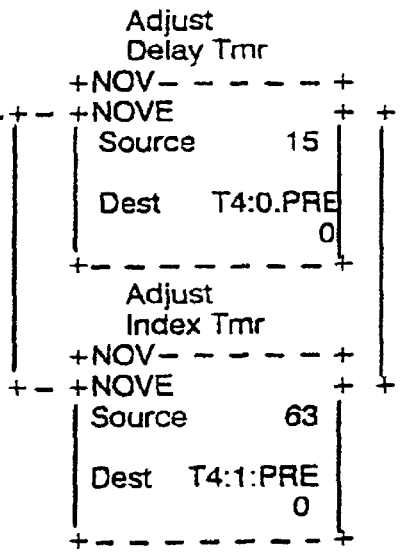
Rung 2:11
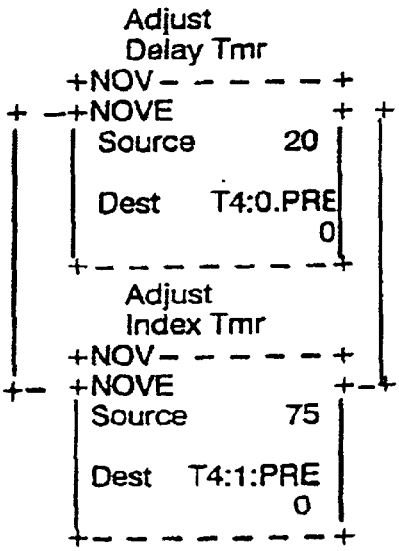
FIG. 12D AIR ASSISTED COLLATOR
PROGRAM LISTING
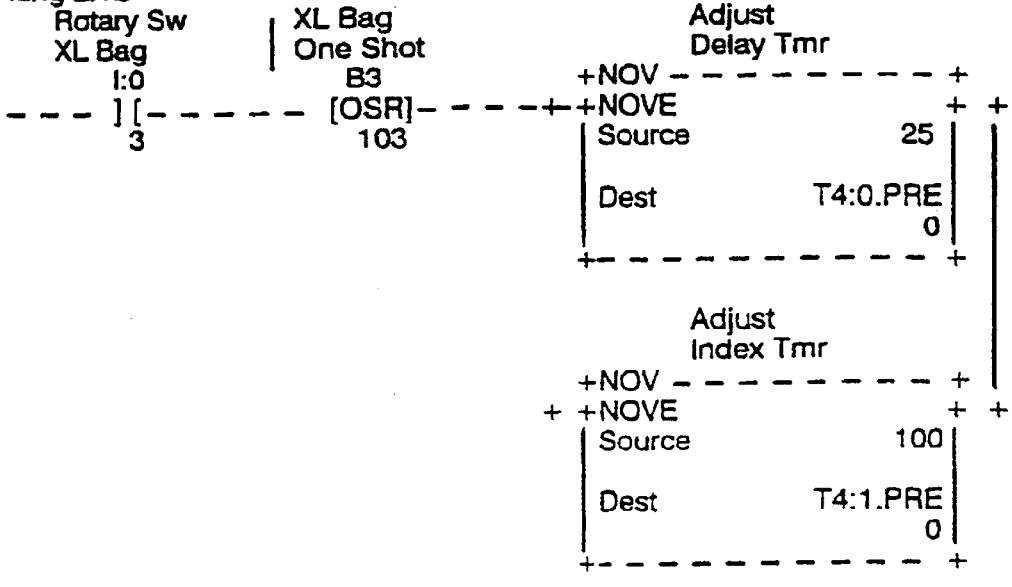
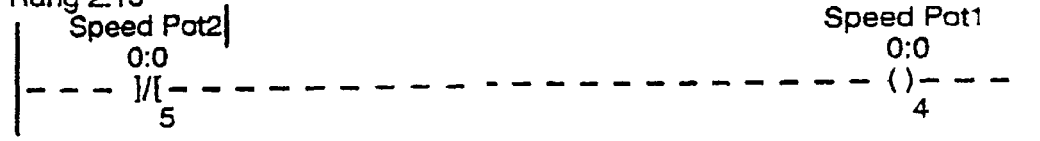
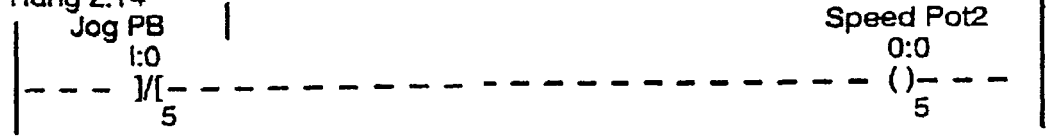
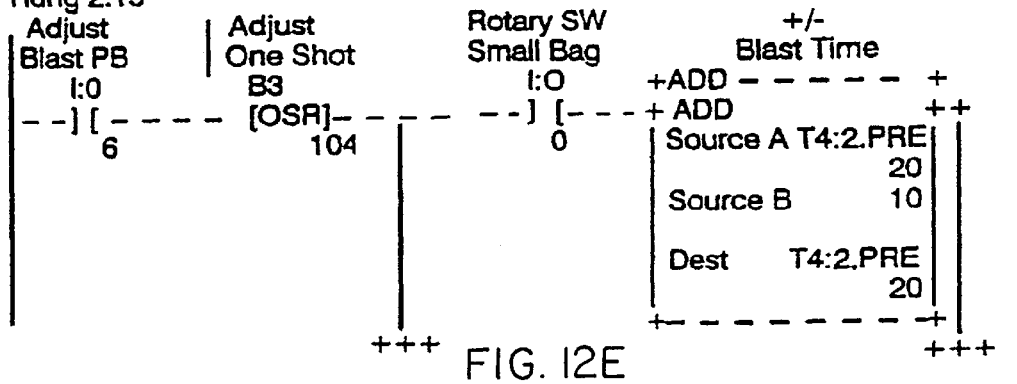
FIG. 12E AIR ASSISTED COLLATOR
PROGRAM LISTING
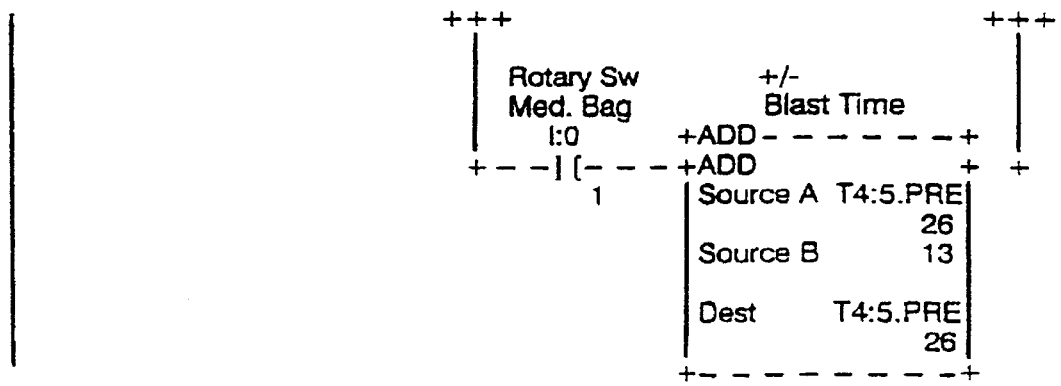
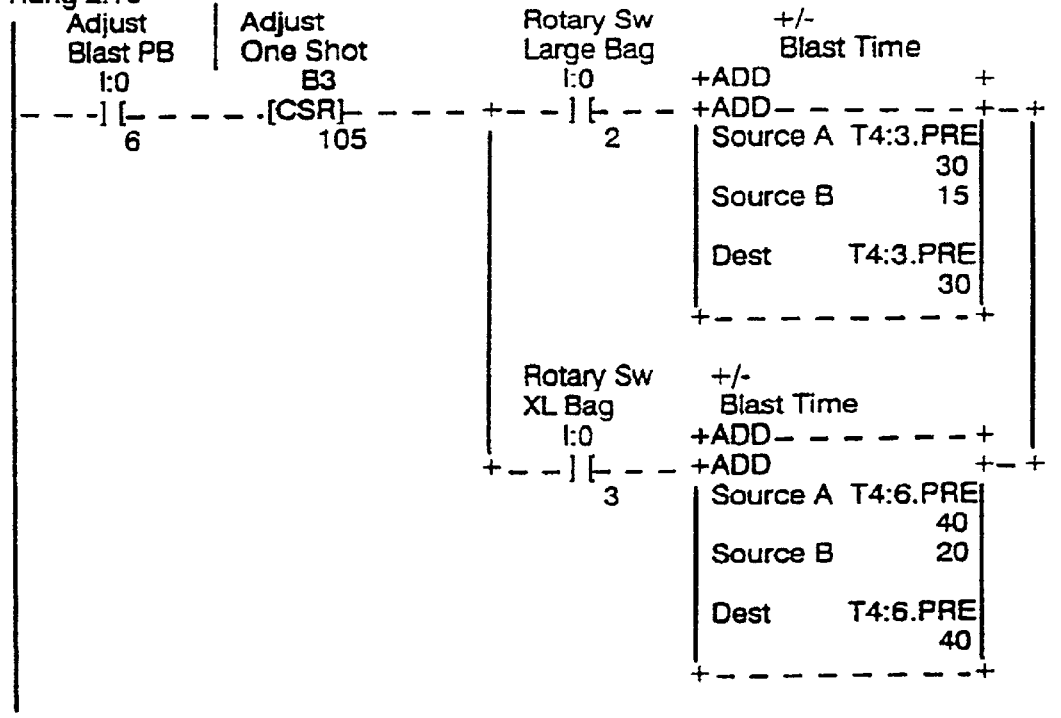
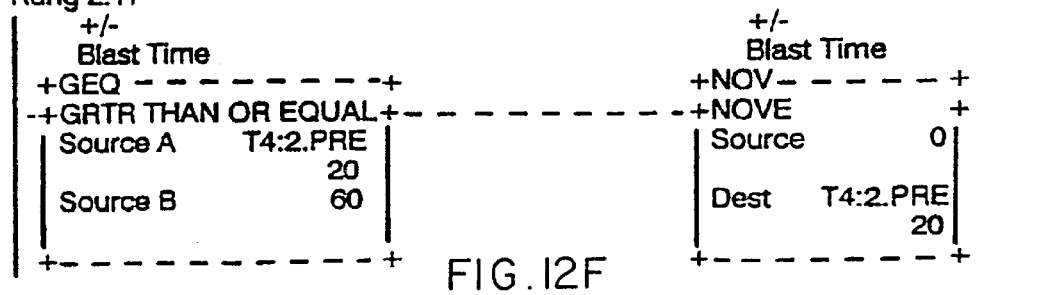
FIG. 12F

AIR ASSISTED COLLATOR PROGRAM LISTING
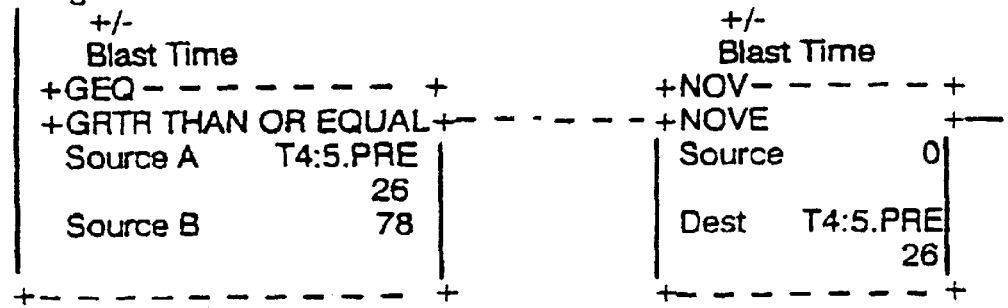
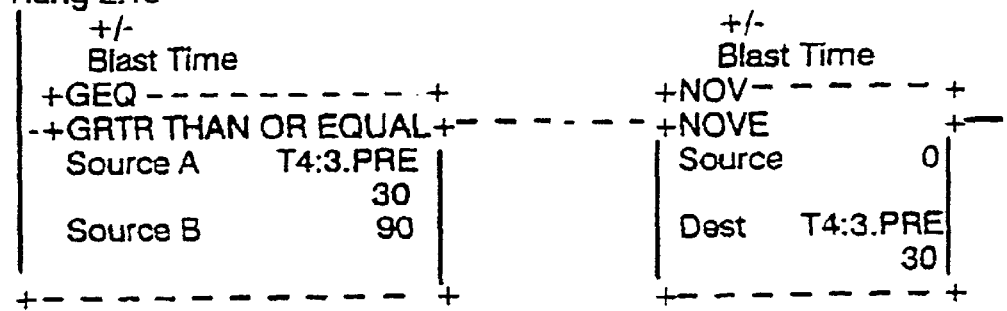
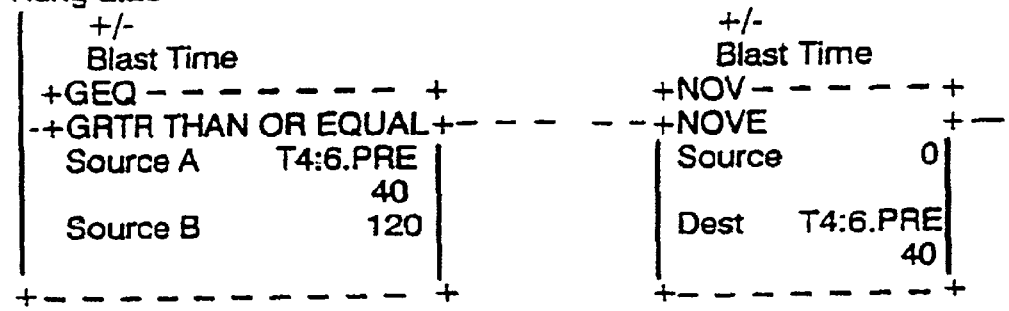
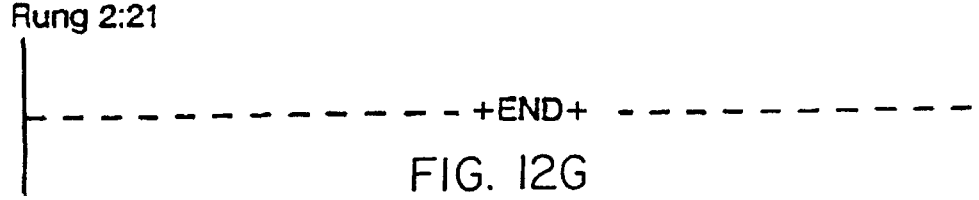
FIG. 12G

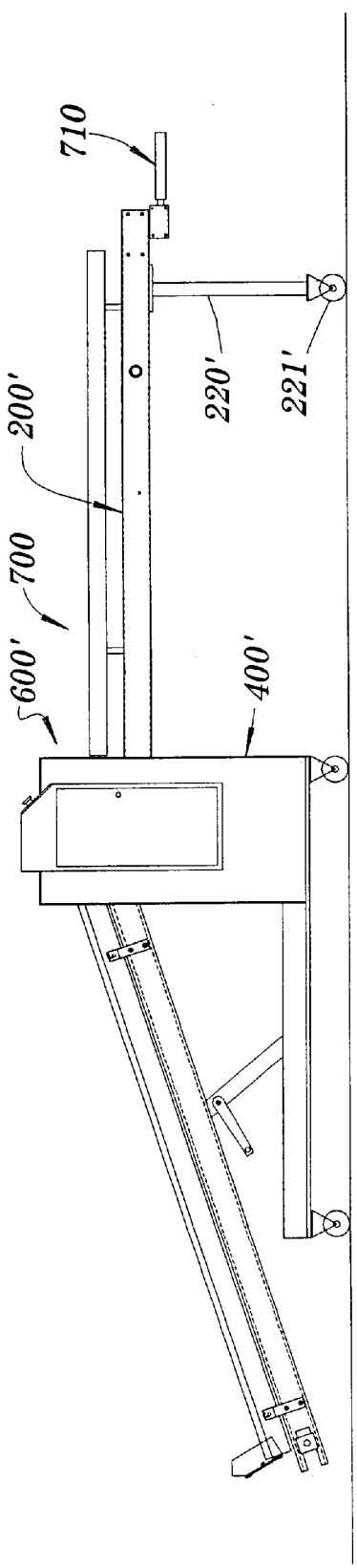
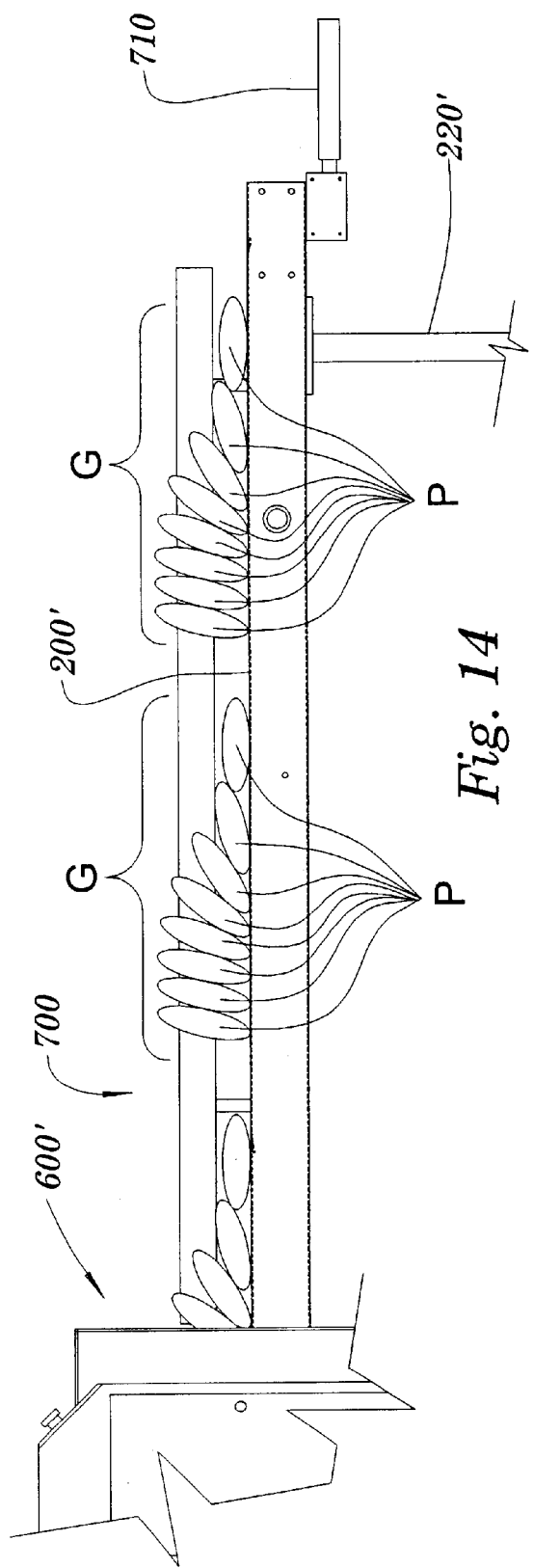
Fig. 13
Fig. 14

RUNG 2:0 - START/STOP CONTROL.
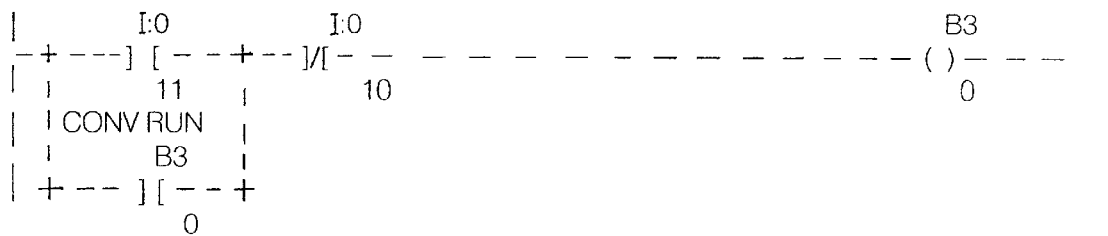
RUNG 2:1 AND 2:2 - INDEXING CONTROLS.
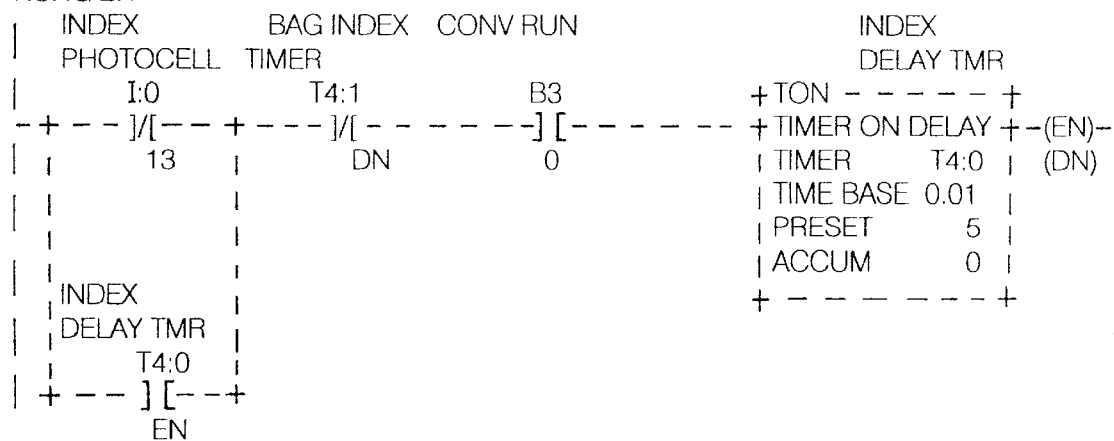
RUNGS 2:3 THRU 2:5-AIR BLAST TIMER CONTROLS.
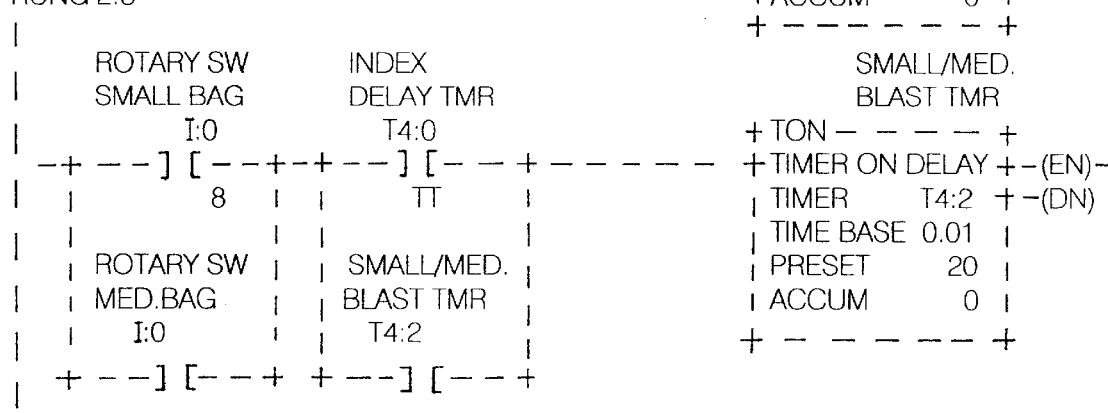
FIG.16A

```
RUNGS 2:4
|   ROTARY SW      INDEX                                         LARGE BAG
|   LARGE BAG      DELAY TMR                                     BLAST TMR            |
|     I:0            T4:0                                    + TON - - - - - +        |
|---] [---+---] [---+- - - - - - - - - + TIMER ON DELAY +-(EN)-
|      6    |      TT     |                               |  TIMER      T4:3+-(DN)
|           |             |                               |  TIME BASE  0.01 |        |
|           |             |                               |  PRESET        0 |        |
|           |             |                               |  ACCUM         0 |        |
|           |             |                               +- - - - - - -+             |
|           |  LARGE BAG  |                                                           |
|           |  BLAST TMR  |                                                           |
|           |     T4:3    |                                                           |
|           +---] [-----+                                                             |
RUNG 2:5                 TT
|   ROTARY SW      INDEX                                         XL BAG
|   XL BAG         DELAY TMR                                     BLAST TMR            |
|     I:0            T4:0                                    + TON - - - - - +·       |
|---] [---+---] [---+- - - - - - - + TIMER ON DELAY +-(EN)-
|      5    |      TT     |                               |  TIMER      T4:4+-(DN)
|           |             |                               |  TIME BASE  0.01 |        |
|           |             |                               |  PRESET        0 |        |
|           |             |                               |  ACCUM         0 |        |
|           |             |                               +- - - - - - -+             |
|           |   XL BAG    |                                                           |
|           |  BLAST TMR  |                                                           |
|           |     T4:4    |                                                           |
|           +---] [-----+                                                             |
                         TT
RUNGS 2:6 THRU 2:9-INDEX DELAY AND BAG INDEX TIMER ADJUSTMENT CONTROLS.
RUNG 2:6
|   ROTARY SW     | SMALL BAG                              ADJ INDEX                  |
|   SMALL BAG     | ONE SHOT                               DELAY TMR                  |
|     I:0             B3                                  + MOV - - - - - +           |
|---] [- - - - - [OSR] - - - - - - - -+-+ MOVE           +-+-
|      8              100                |  | SOURCE        5 |   |
|                                        |  | DEST   T4:0.PRE |   |
|                                        |  |              5  |   |
|                                        |  +- - - - - -+         |
|                                        |           ADJ BAG                          |
|                                        |           INDEX TMR                        |
|                                        | + MOV - - - - +                            |
|                                        +-+ MOVE        +-+
|                                          | SOURCE      25 |
|                                          | DEST   T4:1.PRE|
|                                          |             25 |
|                                          +- - - - - -+                              |
                           FIG.16B
```

RUNGS 2:6 THRU 2:9-INDEX DELAY AND BAG INDEX TIMER ADJUSTMENT CONTROLS.
RUNG 2:7
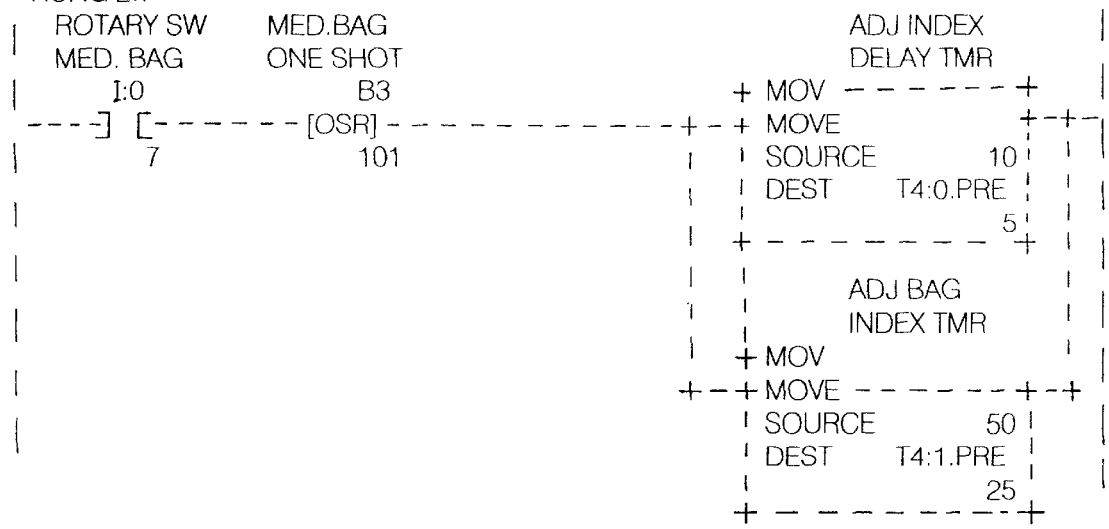
RUNGS 2:6 THRU 2:9-INDEX DELAY AND BAG INDEX TIMER ADJUSTMENT CONTROLS.
RUNG 2:8
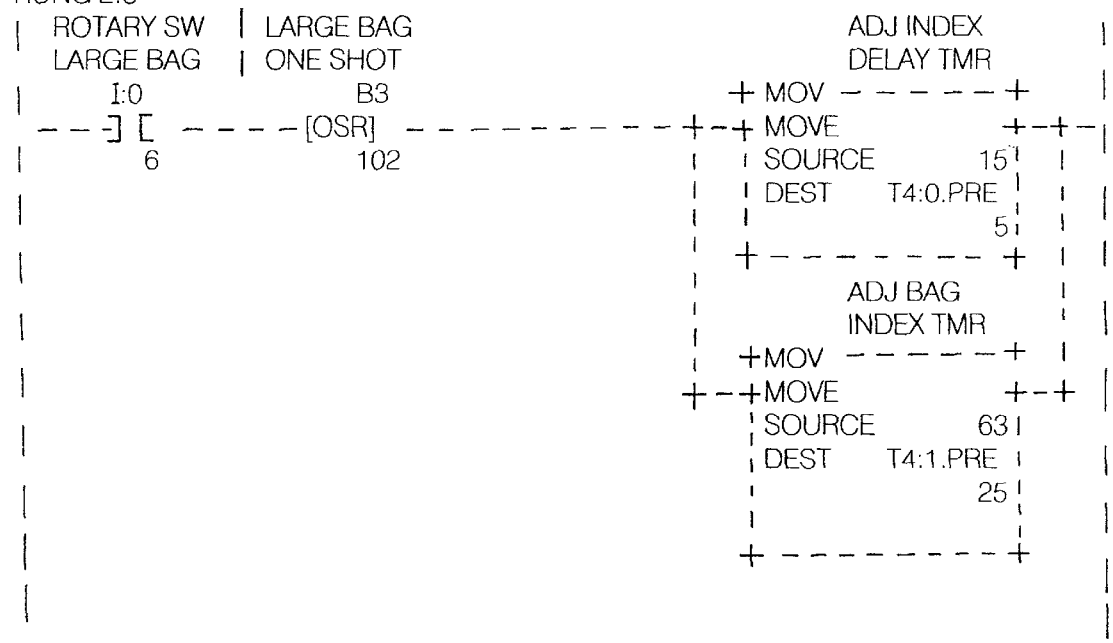
FIG. 16C RUNGS 2:6 THRU 2:9-INDEX DELAY AND BAG INDEX TIMER ADJUSTMENT CONTROLS.
RUNG 2:9
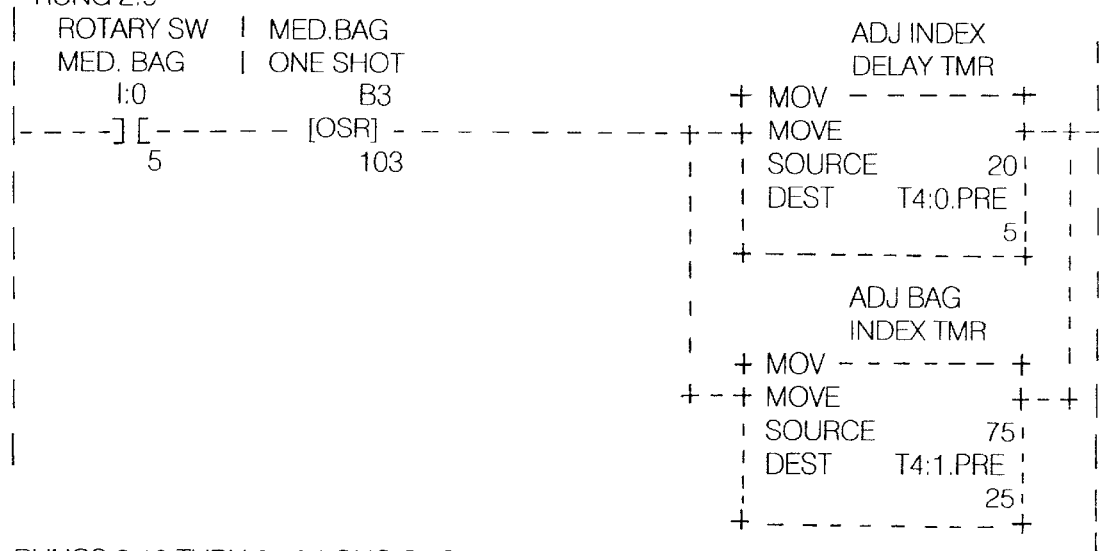
RUNGS 2:10 THRU 2:12-LONG/SHORT AIR BLAST TIME CONTROLS.
RUNG 2:10
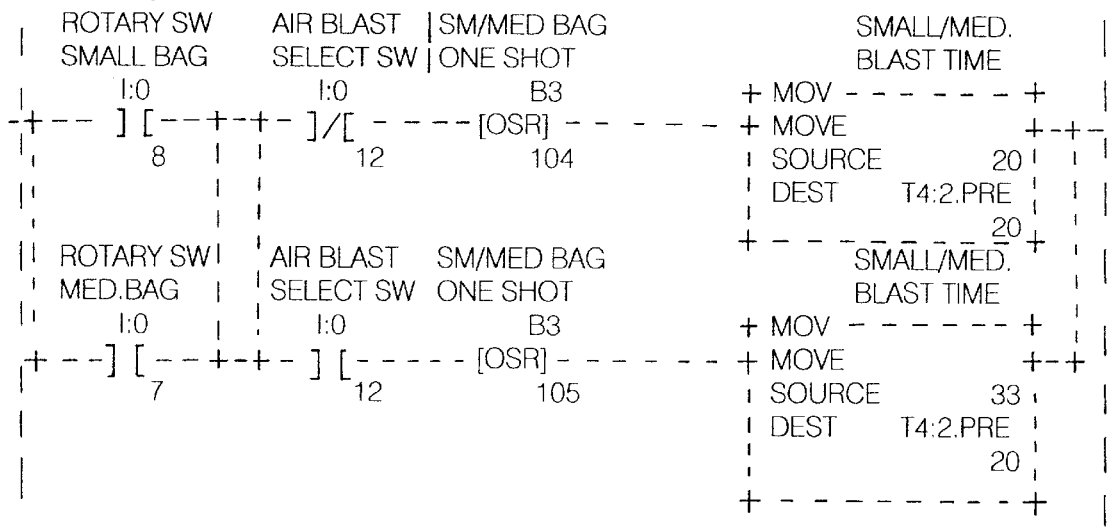
FIG. 16D

```
RUNGS 2:11
|  ROTARY SW            AIR BLAST    LARGE BAG                LARGE BAG           |
|  LARGE BAG            SELECT SW    ONE SHOT                 BLAST TIME          |
|    I:0                  I:0           B3           + MOV ------+                |
|---] [-------+---]/[-----[OSR]---   + MOVE              +-+-    |
|     6       |     12           106   | SOURCE      33 |  |  |
|             |                         | DEST    T4:3.PRE|  |  |
|             |                         |              0 |  |  |
|             |                         +----------------+  |  |
|             |                                              |  |
|             '  AIR BLAST    LARGE BAG                LARGE BAG           |
|             '  SELECT SW    ONE SHOT                 BLAST TIME          |
|             |    I:0           B3           + MOV ------+                |
|             +---] [-----[OSR]---   + MOVE              +-+   |
|             |     12           107   | SOURCE      50  |     |
|             |                         | DEST    T4:3.PRE|     |
|             |                         |              0 |     |
|             |                         +----------------+     |

RUNG 2:12
|  ROTARY SW            AIR BLAST    XL BAG                   XL BAG              |
|  XL BAG               SELECT SW    ONE SHOT                 BLAST TIME          |
|    I:0                  I:0           B3           + MOV -----+                 |
|---] [-------+---]/[-----[OSR]---   + MOVE              +-+-   |
|     5       |     12           108   | SOURCE      50 |  |   |
|             |                         | DEST    T4:4.PRE|  |  |
|             |                         |              0 |  |  |
|             |                         +----------------+  |  |
|             |                                              |  |
|             '  AIR BLAST    XL BAG                   XL BAG              |
|             '  SELECT SW    ONE SHOT                 BLAST TIME          |
|             |    I:0           B3           + MOV ------+                |
|             +---] [-----[OSR]---   + MOVE              +-+    |
|             |     12           109   | SOURCE      75 |      |
|             |                         | DEST    T4:4.PRE|     |
|             |                         |              0 |     |
|             |                         +----------------+     |

RUNGS 2:13 AND 2:14 - AIR BLAST SOLENOID CONTROLS.
RUNG 2;13
|  SMALL/MED.                                           LOW AIR            |
|  BLAST TMR                                            BLAST SOL.         |
|    T4:2                                                  O:0             |
|---] [----------------------------------------( )---    |
|     TT                                                   1              |
```

FIG. 16E

```
RUNGS 2:14
    LARGE BAG                                              HIGH AIR
    BLAST TMR                                              BLAST SOL.
      T4:3                                                   O:0
 -+---] [---+-------------------------------( )---
  |         |
  |   TT    |                                                 2
  |  XL BAG |
  | BLAST TMR|
  |   T4:4  |
  +---] [---+
      TT
RUNGS 2:15 THRU 2:22 - DC MOTOR SPEED CONTROLS.
RUNG 2:15
   FULL/JOG BAG INDEX   PULLED GAP                         INDEXING
   SPEED      TIMER     SPEED                              SPEED
    O:0       T4:1       O:0                                O:0
  ---]/[--- ] [-----]/[-------------------( )---
     9        TT        10                                   8
RUNG 2:16
    JOG PB'S                                               FULL/JOG
                                                           SPEED
      I:0                                                    O:0
 -+---] [---+--------------------------------( )---
  |    9    |                                                 9
  | ROTARY SW|
  | CONTINUOUS|
  |    I:0  |
  +---] [---+
       4
RUNG 2:17
    ROTARY SW  INDEXING | FULL/JOG | GAP TIMER |          PULLED GAP
    SMALL BAG  SPEED    |  SPEED   |           |          SPEED
      I:0       O:0        O:0         T4:5                 O:0
 -+---] [---+-]/[-----]/[------] [-----------( )---
  |    8    |  8         9          TT                      10
  | ROTARY SW|
  | MED. BAG |
  |    I:0  |
  +---] [---+
  |    7    |
  | ROTARY SW|
  | LARGE BAG|
  |    I:0  |
  +---] [---+
  |    6    |
  | ROTARY SW|
  | XL BAG  |
  |    I:0  |
  +---] [---+
       5
```

FIG. 16F

```
RUNGS 2:18
|  ROTARY SW    | SMALL BAG                              GAP TIMER
|  SMALL BAG    | ONE SHOT
|    I:0            B3                          +MOV — — — — +
|---] [--------[OSR]------------+MOVE              +—
|     8             110                         | SOURCE       50 |
|                                                | DEST    T4:5.PRE |
|                                                |              50 |
|                                                +— — — — — — +

RUNG 2:19
|  ROTARY SW    | MED.BAG                                GAP TIMER
|  MED.BAG      | ONE SHOT
|    I:0            B3                          +MOV — — — — +
|---] [--------[OSR]------------+MOVE              +—
|     7             111                          | SOURCE       63 |
|                                                 | DEST    T4:5.PRE |
|                                                 |              50 |
|                                                 +— — — — — — +

RUNG 2:20
|  ROTARY SW    | LARGE BAG                              GAP TIMER
|  LARGE BAG    | ONE SHOT
|    I:0            B3                          +MOV — — — — +
|---] [--------[OSR]------------+MOVE              +—
|     6             112                           | SOURCE       75 |
|                                                  | DEST    T4:5.PRE |
|                                                  |              50 |
|                                                  +— — — — — — +

RUNG 2:21
|  ROTARY SW    | XL BAG                                 GAP TIMER
|  XL BAG       | ONE SHOT
|    I:0            B3                          +MOV — — — — +
|---] [--------[OSR]------------+MOVE              +—
|     5             113                           | SOURCE      100 |
                                                   | DEST    T4:5.PRE |
                                                   |              50 |
                                                   +— — — — — — +

RUNG 2:22
|      COUNTER                                        GAP TIMER
|        C5:1                                    +TON            +
|--+--] [--+-----------+TIMER ON DELAY  +(EN)-
|   |    DN   |                                  | TIMER    T4:5+(DN)|
|   |        |                                   | TIME BASE    0.01 |
|   |        |                                   | PRESET         50 |
|   |        |                                   | ACCUM           0 |
|   |        |                                   +— — — — — — +
|   | GAP TIMER |
|   |   T4:5   |
|   +--] [--+
|          TT

FIG. 16G
```

```
RUNGS 2:23 THRU 2:28 - OPTIONAL LOOSE PACK CONTROLS.
  RUNG 2:23
|    ROTARY SW       COUNTER                      LOOSE PACK           |
|    CONTINUOUS                                   OSCILLATOR           |
|       I:0            C5:1                    + CTU - - - - +         |
|    - -] [- - - - -] [- - - - - - - - + COUNT UP      + -(CU)-|
|        4              DN                     ' COUNTER    C5:0+ -(DN) |
|                                              ' PRESET        2       |
|                                              ' ACCUM         0       |
|                                              + - - - - - - -+        |

RUNG 2:24
|    SWITCHING       SWITCH DEL                   SWITCH DEL           |
|      BIT            TIMER #1                     TIMER #1            |
|       B3             T4:6                      + TON          +      |
|  -+--] [-- +- - ]/[- - - - - - + TIMER ON DELAY + -(EN)-|
|   |    114  |        DN                        TIMER     T4:6+ -(DN) |
|   |         |                                  TIME BASE    0.01     |
|   |         |                                  PRESET        50      |
|   |         |                                  ACCUM          0      |
|   |         |                                  + - - - - - -+        |
|   |  SWITCH DEL |                                                    |
|   |  TIMER #1   |                                                    |
|   |    T4:6    |                                                    |
|   +---] [---+                                                        |
|         EN                                                           |

RUNG 2:25
|    LOOSE PACK     SWITCH BIT                    SWITCHING           |
|    OSCILLATOR     ONE SHOT                       BIT                |
| +EQU - - - - - +     B3                                   B3        |
| -+ EQUAL       +--[OSR]- - - - - - - - - - - ( ) - - -|
|  | SOURCE A C5:0.ACC |   115                            114         |
|  |              0|                                                  |
|  | SOURCE B     1|                                                  |
|  +- - - - - - -+                                                    |

RUNG 2:26
|   | SWITCH DEL |                                 LOOSE PACK         |
|   |  TIMER #1  |                                  DIVERTER          |
|   |    T4:6    |                                   O:0              |
|   ---] [- - - - - - - - - - - - - - - - (L)- - -|
|         DN                                          3                |
```

FIG. 16H

```
RUNGS 2:27
             LOOSE PACK           SWITCH DEL              LOOSE PACK
             OSCILLATOR           TIMER #2                OSCILLATOR
         + EQU - - - - - +          T4:7             + MOV - - - - +
-+-+ EQUAL           +-+-]/[- - - - -+-+ MOVE               +---+-
 |  | SOURCE A C5:0.ACC |   |  DN           |  | SOURCE         0 |     |
 |  |                 0 |   |              |  |                     |     |
 |  | SOURCE B        2 |   |              |  | DEST   C5:0.ACC |     |
 |  +- - - - - - - - -+   |              |  |                 0 |     |
 |                          |              |  + - - - - - +
 |    SWITCH DEL           |              |     SWITCH DEL
 |    TIMER #2             |              |     TIMER #2
 |      T4:7               |              |  + TON - - - - +
 +- - -] [- - - - - - -+              +-+ TIMER ON DELAY +-(EN)-+
          EN                                  | TIMER       T4:7+-(DN)
                                              | TIME BASE   0.01 |
                                              | PRESET        50 |
                                              | ACCUM          0 |
                                              +- - - - - +

RUNG 2:28
    SWITCH DEL |                                    LOOSE PACK
    TIMER #2   |                                    DIVERTER
      T4:7                                            O:0
---] [- - - - - - - - - - - - - - - - - - -(U)- - -
     DN                                                3
RUNGS 2:29 THRU 2:32-STROBE CONTROLS. THE OUTPUTS WILL STROBE ONCE
WHENEVER THE START BUTTON IS PRESSED, OR WHEN THE COUNTER REACHES IT'S
COUNT. THIS WILL LOAD THE VALUE ON THE THUMBWHEEL SWITCHES INTO MEMORY.
RUNG 2:29
    START PB  | START PB |                        START
              | ONE SHOT |
      I:0          B3                               B3
---] [- - -[OSR]- - - - - - - - - - - - -( )- - -
      11          20                                21
```

FIG. 16I

```
RUNG 2:30
 |     START                                   1'S COUNT
 |                                              TIMER
 |         B3                                  +TON - - - - +
 |-+---] [---+-  -  -  -  - - - +-+TIMER ON DELAY+ - (EN)-+-|
 | |    21   |                  +-+TIMER      T4:8+ - (DN) | |
 | |         |                    | TIME BASE  0.01 |      | |
 | |         |                    | PRESET       10 |      | |
 | |         |                    | ACCUM         0 |      | |
 | |         |                    +- - - - - - - - -+      | |
 | |  COUNTER|                    |  1'S COUNT             | |
 | |    C5:1 |                    |    O:0                 | |
 | +---] [---+                    +- - ( ) - - - - - - - - +
 | |    DN                                4
 | | 1'S COUNT
 | |  TIMER
 | |   T4:8
 | +---] [---+
 |      TT
RUNG 2:31
 |   1'S COUNT                                 10'S COUNT
 |    TIMER                                     TIMER
 |     T4:8                                    +TON - - - - - +
 +-+---] [---+- - - - - - - - - +-+TIMER ON DELAY+ - (EN)-+-|
 | |         |                  | | TIMER      T4:9+ - (DN) | |
 | |         |                  | | TIME BASE  0.01         | |
 | |         |                  | | PRESET       10         | |
 | |         |                  | | ACCUM         0         | |
 | |         |                  | +- - - - - - -+           | |
 | | 10'S COUNT|                |                           | |
 | |  TIMER    |                |  10'S COUNT               | |
 | |   T4:9    |                |    O:0                    | |
 |+---] [---+                    +---( ) - - - - - - +
 |      TT                                5
RUNG 2:32
 |   10'S COUNT                                100'S
 |    TIMER                                    COUNT TMR
 |     T4:9                                   +TON - - - - - +
 +-+---] [---+                  +-+TIMER ON DELAY +-(EN)-+-|
 | |    DN   |                  | | TIMER     T4:10+-(DN) | |
 | |         |                  | | TIME BASE  0.01       | |
 | |         |                  | | PRESET       10       | |
 | |         |                  | | ACCUM         0       | |
 | |         |                  | +- - - - - - - +         |
 | |  100'S  |                  |   100'S                  |
 | | COUNT TMR|                 |   COUNT                  |
 | |   T4:10 |                  |    O:0                   |
 | +---] [---+                  +----( ) - - - - - - +
 |      TT                               6
```

FIG. 16J

RUNGS 2:33 THRU 2:42-NUMBER CONTROL FOR ALL THUMBWHEEL SWITCHES.

RUNG 2:33
```
| 1'S STROBE  2'S STROBE  4'S STROBE  8'S STROBE          ZERO      |
|    I:0        I:0         I:0         I:0                B3      |
|---]/[--------]/[---------]/[---------]/[---------------( )-------|
|    0          1           2           3                  10      |
```

RUNG 2:34
```
| 1'S STROBE  2'S STROBE  4'S STROBE  8'S STROBE          ONE       |
|    I:0        I:0         I:0         I:0                B3       |
|---] [--------]/[---------]/[---------]/[---------------( )--------|
|    0          1           2           3                  11       |
```

RUNG 2:35
```
| 1'S STROBE  2'S STROBE  4'S STROBE  8'S STROBE          TWO       |
|    I:0        I:0         I:0         I:0                B3       |
|---]/[--------] [---------]/[---------]/[---------------( )--------|
|    0          1           2           3                  12       |
```

RUNG 2:36
```
  1'S STROBE  2'S STROBE  4'S STROBE  8'S STROBE          THREE
|    I:0        I:0         I:0         I:0                B3       |
|---] [--------] [---------]/[---------]/[---------------( )--------|
|    0          1           2           3                  13       |
```

RUNG 2:37
```
| 1'S STROBE  2'S STROBE  4'S STROBE  8'S STROBE          FOUR      |
|    I:0        I:0         I:0         I:0                B3       |
|---]/[--------]/[---------] [---------]/[---------------( )--------|
|    0          1           2           3                  14       |
```

RUNG 2:38
```
| 1'S STROBE  2'S STROBE  4'S STROBE  8'S STROBE          FIVE      |
|    I:0        I:0         I:0         I:0                B3       |
|---] [--------]/[---------] [---------]/[---------------( )--------|
|    0          1           2           3                  15       |
```

RUNG 2:39
```
| 1'S STROBE  2'S STROBE  4'S STROBE  8'S STROBE          SIX       |
|    I:0        I:0         I:0         I:0                B3       |
|---]/[--------] [---------] [---------]/[---------------( )--------|
|    0          1           2           3                  16       |
```

RUNG 2:40
```
| 1'S STROBE  2'S STROBE  4'S STROBE  8'S STROBE          SEVEN     |
|    I:0        I:0         I:0         I:0                B3       |
|---] [--------] [---------] [---------]/[---------------( )--------|
|    0          1           2           3                  17       |
```

RUNG 2:41
```
| 1'S STROBE  2'S STROBE  4'S STROBE  8'S STROBE          EIGHT     |
|    I:0        I:0         I:0         I:0                B3       |
|---]/[--------]/[---------]/[---------] [---------------( )--------|
|    0          1           2           3                  18       |
```

FIG. 16K

RUNGS 2:42
```
 1'S STROBE  2'S STROBE  4'S STROBE  8'S STROBE              NINE
    I:0         I:0         I:0         I:0                   B3
---] [--------]/[--------]/[--------] [---------------( )-------
    0           1           2           3                     19
```
RUNGS 2:43 THRU 2:47-EVALUATE THUMBWHEEL SETTINGS AND LOAD VALUE INTO N7:0.

RUNG 2:43
```
   1'S COUNT                  ZERO                  I'S PLACE
      O:0                      B3              +MOV--------+
----] [--------------+-----] [------+MOVE               +-+-
      4              |       10     | SOURCE     0 |    | |
                     |              | DEST      N7:1|    | |
                     |              |              3|    | |
                     |              +--------------+    | |
                     |      ONE                  1'S PLACE
                     |       B3              +MOV--------+
                     +-----] [------+MOVE               +-+
                     |       11     | SOURCE     1 |    | |
                     |              | DEST      N7:1|    | |
                     |              |              3|    | |
                     |              +--------------+    | |
                     |      TWO                  1'S PLACE
                     |       B3              +MOV-------+
                     +-----] [------+MOVE              +-+
                     |       12     | SOURCE     2 |   | |
                     |              | DEST      N7:1|   | |
                     |              |              3|   | |
                     |              +--------------+   | |
                     |      THREE                1'S PLACE
                     |       B3              +MOV------+
                     +-----] [------+MOVE             +-+
                     |       13     | SOURCE     3 |  | |
                     |              | DEST      N7:1|  | |
                     |              |              3|  | |
                     |              +-------------+   | |
                     |      FOUR                 1'S PLACE
                     |       B3              +MOV--------+
                     +-----] [------+MOVE               +-+
                     |       14     | SOURCE     4 |    | |
                     |              | DEST      N7:1|    | |
                     |              |              3|    | |
                     |              +--------------+    | |
                     |      FIVE                 1'S PLACE
                     |       B3              +MOV--------+
                     +-----] [------+MOVE               +-+
                     |       15     | SOURCE     5 |    | |
                     |              | DEST      N7:1|    | |
                     |              |              3|    | |
                     |              +--------------+    | |
                     +-+-+                                  +-+-+
```

FIG. 16L

```
                          +++                              +++
                           |                                |
                         | SIX             1'S PLACE       |
                         |  B3          + MOV - - - - - +-+ |
                         +- -] [- - - + MOVE            + |  |
                         |   16       | SOURCE       6 |   |
                         |            | DEST       N7:1 |  |
                         |            |              3 |   |
                         |            + - - - - - - - +  |
                         | SEVEN           1'S PLACE       |
                         |  B3          +MOV - - - - - +  |
                         +- -] [ - -  + MOVE          +-+ |
                         |   17       | SOURCE       7 |  |
                         |            | DEST       N7:1|  |
                         |            |              3 |  |
                         |            + - - - - - - - +  |
                         | EIGHT           1'S PLACE       |
                         |  B3          + MOV - - - - - + |
                         +- -] [- - - + MOVE           +-+ |
                         |   18       | SOURCE       8 |  |
                         |            | DEST       N7:1|  |
                         |            |              3 |  |
                         |            + - - - - - - - +  |
                         | NINE            1'S PLACE       |
                         |  B3          + MOV - - - - + |
                         +- -] [- - - + MOVE           +-+ |
                         |   19       | SOURCE       9 |  |
                         |            | DEST       N7:1|  |
                         |            |              3 |  |
                         |            + - - - - - - - +
RUNG 2:44
   10'S COUNT  ZERO                  10'S PLACE
|    O:0       B3         + MOV - - - - - +
- - -] [--+-+--] [--      + MOVE                +-+ - - - - - - +-|
|    5    | |  10         | SOURCE       0 |    |
|         | |             | DEST       N7:2|    |
|         | |             |              0 |    |
|         | |             + - - - - - - +      |
|         | | ONE                  10'S PLACE
|         | |  B3         + MOV - - - - - - + |
|         +--] [- - - + MOVE                +-+ |
|         |    11         | SOURCE       1 |   |
|         |               | DEST       N7:2|   |
|         |               |              0 |   |
|         |               + - - - - - - - +   |
|         |
|    -+-+-                              +++              +++
|
```

FIG. 16M

```
+++++                                          +++       + ++
|    |   |   TWO            10'S PLACE         |          |    |  |
|    |   |         B3    +MOV------+           |          |    |  |
|    +---] [----+MOVE            +-+           |          |    |  |
|    |   |   12    |SOURCE       2|            |          |    |  |
|    |   |         |DEST       N7:2|           |          |    |  |
|    |   |         |              0|           |          |    |  |
|    |   |         +-------+                   |          |    |  |
|    |   |                                     |          |    |  |
|    |   |   THREE         10'S PLACE          |          |    |  |
|    |   |         B3    +MOV------+           |          |    |  |
|    +---] [--+MOVE               +-+          |          |    |  |
|    |   |   13    |SOURCE       3|            |          |    |  |
|    |   |         |DEST       N7:2|           |          |    |  |
|    |   |         |              0|           |          |    |  |
|    |   |         +-------+                   |          |    |  |
|    |   |                                     |          |    |  |
|    |   |   FOUR          10'S PLACE          |          |    |  |
|    |   |         B3    +MOV-----+            |          |    |  |
|    +---] [--+MOVE               +-+          |          |    |  |
|    |   |   14    |SOURCE       4|            |          |    |  |
|    |   |         |DEST       N7:2|           |          |    |  |
|    |   |         |              0|           |          |    |  |
|    |   |         +-------+                   |          |    |  |
|    |   |                                     |          |    |  |
|    |   |   FIVE          10'S PLACE          |          |    |  |
|    |   |         B3    +MOV-----+            |          |    |  |
|    +---] [--+MOVE               +-+          |          |    |  |
|    |   |   15    |SOURCE       5|            |          |    |  |
|    |   |         |DEST       N7:2|           |          |    |  |
|    |   |         |              0|           |          |    |  |
|    |   |         +-------+                   |          |    |  |
|    |   |                                     |          |    |  |
|    |   |   SIX           10'S PLACE          |          |    |  |
|    |   |         B3    +MOV-----+            |          |    |  |
|    +---] [--+MOVE               +-+          |          |    |  |
|    |   |   16    |SOURCE       6|            |          |    |  |
|    |   |         |DEST       N7:2|           |          |    |  |
|    |   |         |              0|           |          |    |  |
|    |   |         +-------+                   |          |    |  |
|    |   |                                     |          |    |  |
|    |   |   SEVEN         10'S PLACE          |          |    |  |
|    |   |         B3    +MOV-----+            |          |    |  |
|    +---] [--+MOVE               +-+          |          |    |  |
|    |   |   17    |SOURCE       7|            |          |    |  |
|    |   |         |DEST       N7:2|           |          |    |  |
|    |   |         |              0|           |          |    |  |
|    |   |         +-------+                   |          |    |  |
+++++                                          +++       +++
```

FIG. 16N

```
+ + + +                              + + +                    + + +
|  | |     EIGHT          10'S PLACE   |                      |  |
|  | |       B3    +MOV -------+-+     |                      |  |
|  | +--] [-- +MOVE           |  |     |                      |  |
|  |    18   | SOURCE      8 |  |     |                      |  |
|  |         | DEST      N7:2|  |     |                      |  |
|  |         |              0|  |     |                      |  |
|  |         +--------------+  |     |                      |  |
|  |     NINE          10'S PLACE     |                      |  |
|  |       B3    +MOV ------+         |                      |  |
|  | +--] [-- +MOVE        +-+         |                      |  |
|  |    19   | SOURCE    9 |           |                      |  |
|  |         | DEST    N7:2|           |                      |  |
|  |         |            0|           |                      |  |
|  |         +------------+           |                      |  |
|                                          MULTIPLY          |  |
|                                          BY 10             |  |
|                              +MUL --------+                 |  |
+   +-------------------------- +MULTIPLY  +-+                |  |
|                              | SOURCE A      10             |  |
|                              | SOURCE B     N7:2            |  |
|                              |                0             |  |
|                              | DEST          N7:3           |  |
|                              |                0             |  |
|                              +------------+                 |  |
RUNG 2:45                                                    |
  100'S      ZERO         100'S                               |
| COUNT                   PLACE                               |
|   O:0       B3    +MOV ----+                                |
|---] [-+-] [-- +MOVE       +-+--------------------+          |
|    6  |  10   | SOURCE   0 |                      |          |
|       |       | DEST   N7:4|                      |          |
|       |       |          0 |                      |          |
|       |       +-----------+                       |          |
|       | ONE           100'S                       |          |
|       |               PLACE                       |          |
|       |   B3    +MOV ----+                        |          |
|       +-] [--  +MOVE    +-+                       |          |
|          11    | SOURCE  1|                       |          |
|                | DEST  N7:4|                      |          |
|                |         0 |                      |          |
|                +----------+                       |          |
|                                                              |
+ + + +                        + + +                    + + +

FIG. 160
```

```
             TWO          100'S
                          PLACE
                B3  +MOV--------+
          +---] [--+MOVE        +-+
                12 |SOURCE     2
                   |DEST     N7:4
                   |            0
                   +------------+

THREE        100'S
                          PLACE
                B3  +MOV--------+
          +---] [--+MOVE        +-+
                13 |SOURCE     3
                   |DEST     N7:4
                   |            0
                   +------------+

FOUR         100'S
                          PLACE
                B3  +MOV--------+
          +---] [--+MOVE        +-+
                14 |SOURCE     4
                   |DEST     N7:4
                   |            0
                   +------------+

FIVE         100'S
                          PLACE
                B3  +MOV--------+
          +---] [--+MOVE        +-+
                15 |SOURCE     5
                   |DEST     N7:4
                   |            0
                   +------------+

SIX          100'S
                          PLACE
                B3  +MOV--------+
          +---] [--+MOVE        +-+
                16 |SOURCE     6
                   |DEST     N7:4
                   |            0
                   +------------+

SEVEN        100'S
                          PLACE
                B3  +MOV--------+
          +---] [--+MOVE        +-+
                17 |SOURCE     7
                   |DEST     N7:4
                   |            0
                   +------------+
                    FIG. 16P
```

```
+ + + + +                          + + +                    + + +
|  | | | |                          |  |                     |  |
|  | | | EIGHT        100'S         |  |                     |  |
|  | | |              PLACE         |  |                     |  |
|  | |    B3   +MOV — — — — — +     |  |                     |  |
|  +— — ] [ —+MOVE            +— +  |  |                     |  |
|  | |    18  | SOURCE       8 |    |  |                     |  |
|  | |        | DEST       N7:4|    |  |                     |  |
|  | |        |               0|    |  |                     |  |
|  | |        +— — — — — — — — +    |  |                     |  |
|  | |                               |  |                     |  |
|  | | NINE         100'S            |  |                     |  |
|  | |              PLACE            |  |                     |  |
|  | |    B3   +MOV — — — — — +      |  |                     |  |
|  +— — -] [ —+MOVE           +— +   |  |                     |  |
|  | |    19  | SOURCE       9|      |  |                     |  |
|  | |        | DEST      N7:4|      |  |                     |  |
|  | |        |              0|      |  |                     |  |
|  | |        +— — — — — — — +       |  |                     |  |
|  | |                                                        |  |
|  | |                           MULTIPLY                     |  |
|  | |                           BY 100                       |  |
|  | |                       +MUL                       +     |  |
|  +— — — — — — — — — — — — +MULTIPLY                   +— +  |  |
|    |                      | SOURCE A        100 |        |  |
|    |                      | SOURCE B       N7:4 |        |  |
|    |                      | DEST           N7:5 |        |  |
|    |                      |                   0 |        |  |
|                           +— — — — — — — — — — +           |
|                                                            |
RUNG 2:46                                                    |
|  100'S                                ADD 1'S               |
|  COUNT TMR                            AND 10'S              |
|  T4:10                             +ADD — — — — — — +       |
|— — ] [ — — — — — — — — — — — — — — +ADD            +— |
|   DN                               | SOURCE A    N7:1 |    |
|                                    |                3 |    |
|                                    | SOURCE B    N7:3 |    |
|                                    |                0 |    |
|                                    | DEST        N7:6 |    |
|                                    |                3 |    |
|                                    +— — — — — — — — — +    |
```

FIG. 16Q

```
RUNG 2:47
   100'S                                            ADD TOTAL
   COUNT TMR                                        TO 100'S
   T4:10                                          + ADD — — — — — +
---] [— — — — — — — — — — +-+ ADD              +-+
   DN                          | SOURCE A    N7:6 |
                               |                 3 |
                               | SOURCE B    N7:4 |
                               |                 0 |
                               | DEST        N7:0 |
RUNGS 2:48 THRU 2:50 COUNTER CONTROLS.          +  — — — — — 3+
THE COUNTER IS RESET EVERY TIME IT              + MOV — — — — — +
REACHES IT'S COUNT, AND RELOADS THE         +-+ MOVE            +-+
THUMBWHEEL VALUE. THIS HAPPENS ALSO          | SOURCE        N7:0 |
WHEN THE START BUTTON IS PRESSED.            | DEST      C5:1.PRE |
RUNG 2:48                                    |                  3 |
                                             + — — — — — — — — — +
         ADD TOTAL
         TO 100'S                              COUNT SET AT ZERO
   + EQ — — — — — — +                                 B3
-+ EQUAL           + — — — — — — — — — — — — — ( ) — — — — —
   | SOURCE A    N7:0 |                              1
   |              3 |
   | SOURCE B    0 |
   + — — — — — — +
RUNG 2:49
         COUNTER                                   COUNTER
          C5:1                                       C5:1
-+---] [-+ — — — — — — — — — — — — — — — (RES) — — — —
 |   DN  |
 | START PB |
 |   I:0  |
 +--] [--+
       11
RUNG 2:50
INDEX       ROTARY SW  COUNT SET CONV RUN  COUNTER    COUNTER
PHOTOCELL   CONTINUOUS AT ZERO                        ONE SHOT
   I:0         I:0        B3      B3       B3    + CTU — — — — +
-+--]/[- — — -]/[--- +--]/[---] [--[OSR]-+ COUNT UP       +-(CU)-
     13           4          1        0    116 | COUNTER  C5:1+-(DN)
                                               | PRESET       3 |
                                               | ACCUM        0 |
                                               + — — — — — — — +
| LOOSE PACK|ROTARY SW  |
| PHOTOCELL |CONTINUOUS |
|    I:0        I:0     |
+--]/[— — — — —] [--+
     14          4
```

FIG.16R

RUNG 2:51-CONTROLS THE SELECTION OF VFD SPEED PRESETS. THE VFD WILL RUN AT SPEED PRESET #1 WHEN OUTPUT 7 IS LOW. SPEED PRESET #2 IS FOR SMALL BAGS. IF CONTINUOUS BAGS IS SELECTED, THE VFD WILL RUN AT A THIRD PRESET SPEED.
RUNG 2:51
RUNG 2:52
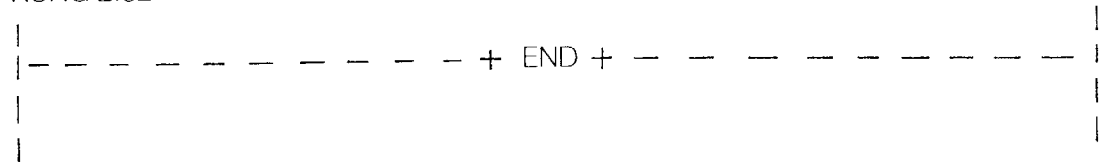
FIG. 16S

AIR ASSISTED COLLATOR

CROSS-REFERENCE TO RELATED APPLICATION

This is a continuation-in-part application under 37 C.F.R. §1.53 of application Ser. No. 08/883,843 filed Jun. 27, 1997, now U.S. Pat. No. 5,941,365 currently pending.

TECHNICAL FIELD

The present invention generally relates to an apparatus for positioning bagged food products on a conveyor and in particular to a conveyor apparatus for collating bagged food products and thereby aiding in the transfer of the bagged food products into shipping cartons.

BACKGROUND AND SUMMARY OF THE INVENTION

Food processing operations typically package products such as potato chips, corn chips, pretzels, etc., in product bags of various sizes ranging from individual serving portions to commercial establishment multiple serving-sized portions. In the art, small bags are typically 4 to 6 inches in height, medium bags 6 to 10 inches in height, large bags 10 to 13 inches in height, and extra large bags 13 to 18 inches in height. The product bags have varying width within each size range depending on the density of the product contained therein. For example, corn chips are more dense than potato chips and pretzels are more dense than corn chips, therefore product bags containing potato chips are wider that those containing corn chips, which in turn are wider than those containing pretzels.

In order to expedite the packaging of individually bagged food products such as potato chips, corn chips, pretzels, etc., into shipping cartons, it is desirable to have the bagged food products in a vertically oriented array. Vertical orienting of bagged food products, known in the art as collating, allows for efficient transition of the bagged food product into shipping cartons. Formerly, the process of gathering the bagged food products from conveyors and transferring them into shipping cartons was a tedious and time consuming labor intensive task. The bagged food products were randomly spaced and horizontally positioned on the conveyor making it difficult to transfer the individually bagged food products from the conveyor into the shipping cartons.

U.S. Pat. No. 4,356,906 issued Nov. 2, 1982 to David M. Fallas, discloses a prior art collator that advanced the art and assisted in gathering and arranging food product bags on a conveyor for transport into shipping cartons. U.S. Pat. Nos. 5,495,932 and 5,615,762, both issued to William B. Dyess and assigned to the Assignee of the present application disclose a conveyor apparatus for collating bag products that uses a bar to engage the packaged food products as they fall from the end of a first inclined conveyor onto a second horizontal conveyor. The bar has a friction enhancing covering surface which aids in pivoting the bagged food products as they fall, thereby properly collating the array of bagged food products. In the aforementioned Dyess collator, the position of the product engaging bar is manually adjustable.

Other prior art collators are known in the industry. One such collator includes a first conveyor having a rotatable discharge drum positioned at the end of an inclined conveyor and comprising a plurality of rotating disks. An air nozzle is adjustably positioned between the rotating disks of the drum. As a bagged food product is discharged over the rotating discharge drum of the inclined conveyor, a blast of air is ejected from the nozzle which strikes the falling product bag and assists in uprighting the bag on a receiving conveyor positioned below the discharge drum of the inclined conveyor. In the prior art collator, the air nozzle must be manually adjusted up or down to properly position the air blast relative to bags of varying product heights. Additionally, the pressure of the air blast must be adjusted manually to take into account the density of the product in the bag.

A need exists for a collator having pre-programmable adjustments based on product bag size and product density thereby eliminating the need for manual adjustment of the collating apparatus. A further need exists for a collating apparatus wherein the operator may adjust the collator while the collator is in operation (i.e., "on the fly").

The present invention includes a discharge conveyor having a rotatable drum position at its discharge end. The rotatable drum is comprised of a plurality of disks. Two pairs of air nozzles are positioned between the rotating disks of the rotatable drum. A receiving conveyor is positioned below the discharge end of the first conveyor. Bagged food products move along the discharge conveyor and are discharged over the rotating drum thereof onto the first conveyor. As each product bag falls toward the receiving conveyor, air blasts assist in uprighting, i.e., collating the product bag. A sensor indicates when the product bag is properly positioned to receive the air blasts for uprighting the bag. The present invention further includes a programmable logic controller ("PLC") which controls the speed and incremental movement of the conveyors, as well as the air pressure and the air blast duration required to effect collating.

A second embodiment of the invention includes a counter which records the number of bags moving through the collator. The counter can be used to activate the receiving conveyor to effect spacing between groups of bags. Alternatively, the counter can be used to activate a diverter mounted at the discharge end of the receiving conveyor which directs a preselected number of bags into each of a plurality of cartons.

BRIEF DESCRIPTION OF THE DRAWINGS

A more complete understanding of the present invention may be had by reference to the following Detailed Description when taken in connection with the accompanying Drawings wherein:

FIG. 3 is a side view of the collator of the first embodiment of the present invention;

FIG. 4 is a top view of the collator of FIG. 3;

FIG. 5 is a sectional side view of the collator of FIG. 4 taken along section line 5—5;

FIG. 6A is a partial section view taken along a section 6A—6A of FIGS. 3 and 4, illustrating the discharge drum of the collator of the present invention;

FIG. 6B is a section view taken along a section 6B—6B of FIGS. 3 and 4;

FIGS. 7A, 7B, 7C, and 7D are respective side and end views of rotatable disk members of the rotatable discharge drum of FIG. 6;

FIGS. 8A and 8B are side views of air discharge nozzles of the present invention;

FIG. 9 is a perspective view of the control panel of the programmable logic controller for the collator of the first embodiment of the present invention;

FIGS. 12A through 12G are a program listing of the control program for the Programmable Logic Controller (PLC) of the collator of the first embodiment of the present invention;

FIG. 13 is a side view similar to FIG. 3 illustrating a second embodiment of the invention;

FIG. 14 is an illustration of a first application of the second embodiment of the invention;

FIGS. 16A through 16S are a program listing of the control program for the Programmable Logic Controller of the collator of the second embodiment of the present invention.

DETAILED DESCRIPTION

Figure 1:
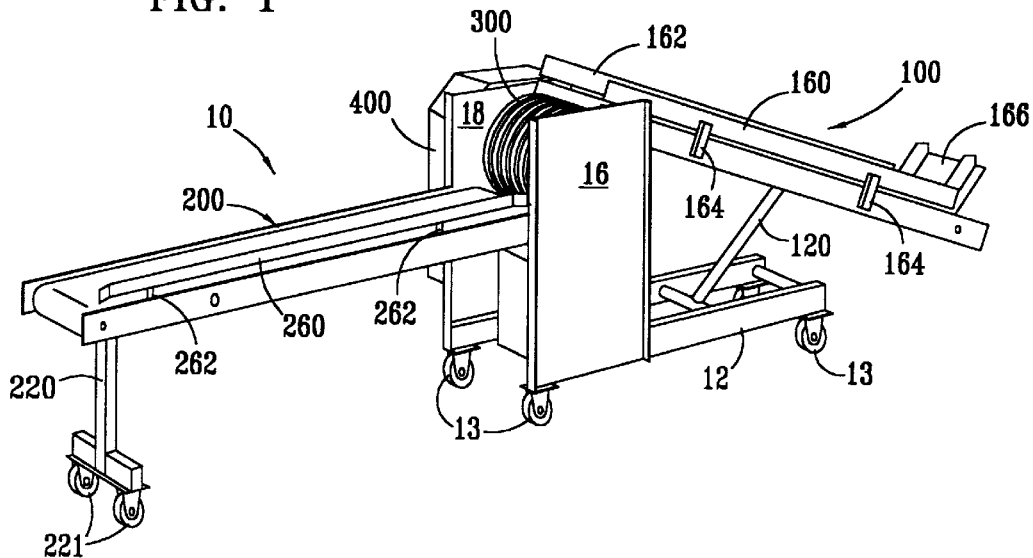
FIG. 1 is a perspective view taken from a discharge end of a collator incorporating a first embodiment of the present invention.
Figure 2:
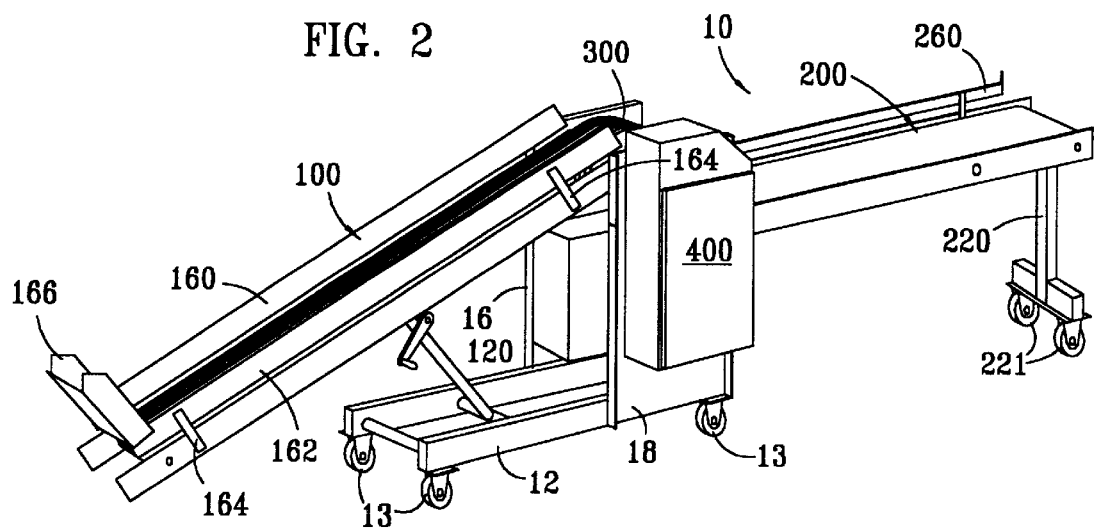
FIG. 2 is a perspective view taken from an input end of the collator of the first embodiment of the present invention.

Reference is now made to the Drawings wherein like reference characters denote like or similar parts throughout the Figures. Referring to FIGS. 1 and 2, therein is illustrated an air assisted collator 10 incorporating a first embodiment of the present invention. The collator 10 comprises a first conveyor 100 having a rotatable discharge drum 300 disposed at its discharge end, a second conveyor 200 positioned below the discharge end of the first conveyor 100 and a programmable logic controller 400 for controlling the operation of the collator 10.

Referring now to FIGS. 4 and 5, the conveyor 100 comprises a frame 112 supported by an adjustable mount 120 connected to a collator support frame 12. The collator support frame 12 includes a plurality of rollers 13 for mobility and side panels 16 and 18. A first idler roller 132 is adjustably mounted in the frame 112 at the inlet end of the first conveyor 100. A plurality of belts 141, 142, 143, 144, 145 and 146 extend longitudinally on conveyor 100. The two exterior belts on each side, belts 141, 142, 145 and 146, are ³¹⁄₃₂ inch wide belts provided by Eagle Belting Co. The two interior belts 143 and 144 are ¾ inch wide belting provided by MoL Belting. The use of the two interior belts 143 and 144 is advantageous for controlling upward movement of small bags.

As illustrated in FIG. 5, belts 141, 142, 143, 144, 145 and 146 each comprises a continuous loop extending over the first idler roller 132, around discharge drum 300, over a second idler roller 150, and back to the idler roller 132. Referring to FIG. 4, the two interior belts 143 and 144 have a surface that includes a friction enhancing coating that provides additional grab between the belts and the product packages carried thereon. As will be understood by those in the art, various types of belting may be used in practice of the present invention. Options include forming all of the belting from the material used in the belts 141, 142, 145 and 146, and forming all of the belting from the material used in belts 143 and 144.

Referring to FIG. 6B, therein is illustrated a cross sectional view of the first conveyor 100. The first conveyor 100 includes two C-shaped side members 114 and 116 that support transverse member 118. Transverse member 118 supports a plurality of longitudinal belt supports 171, 172, 173, 174, 175 and 176 each supporting a respective conveyor belt 141, 142, 143, 144, 145, and 146. The present invention includes an improvement over conveyors of prior art collators in that the longitudinal support members 171–176 have top profiles complimentary to the bottom profile of the respective belts 141–146, thereby supporting and stabilizing the belts.

As illustrated in FIG. 2, the first conveyor 100 further includes two bagged product guide rails 160 and 162 that are adjustably mounted on frame 112 by mounting brackets 164. A feed chute 166 is attached to frame 112. The proximal ends of guide rail 160 and 162 terminate at the discharge drum 300.

FIGS. 4 and 5 illustrate the second conveyor 200. The second conveyor 200 includes a frame 212 supported by an adjustable leg 220 attached at the distal end of the conveyor 200. The leg 220 includes at least two rollers 221 for mobility. A drive roller 230 is positioned at the receiving end of the second conveyor 200 and is driven by a DC drive motor (not shown). A single belt 240 extends longitudinally on the second conveyor 200. The belt 240 is preferably a 10 ¼ inch wide belt manufactured by Thermoid Industries under the trademark Grip-Tex, although other belts may also be used. The belt 240 is configured in a continuous loop positioned around the drive roller 230 and an idler roller located at the distal end of the conveyor 200 (not shown). The second conveyor 200 further includes an adjustable bagged product guide rail 260. The rail 260 is adjustably mounted on the conveyor frame 212 by mounting brackets 262.

Turning now to FIG. 6A, the rotatable discharge drum 300 is positioned at the discharge end of the first conveyor 100. The rotatable discharge drum 300 is comprised of a shaft 310 having a plurality of disks 341, 342, 343, 344, 345 and 346 mounted thereon by means of a key and keyway (see FIG. 7A and 7C). Each disk respectively receives one of the belts 141, 142, 143, 144, 145 and 146. As heretofore discussed, the two interior belts 143 and 144 have a surface that includes a friction enhancing coating that provides additional grab between the belts and the product packages carried thereon. As illustrated in FIGS. 7B and 7D, the two interior belts 143 and 144 also have a different cross-sectional profile from belts 141, 142 and 145 and 146. Therefore, disks 343 and 344 have a correspondingly different profile for receiving belts 143 and 144 (FIGS. 7C and 7D). Disks 341, 342, 345 and 346 receive belts 141, 142, 145 and 146 respectively (FIGS. 7A and 7B).

As illustrated in FIGS. 3, 5 and 6A, the shaft 310 of rotatable drum 300 includes a pulley 330 that receives drive belt 332. The rotatable drum 300 is driven by a continuous speed AC drive motor 334 mounted to side panel 18, acting through a motor pulley 336 and the drive belt 332.

Referring again to FIG. 6A, product guide plate 370 is adjustably mounted to side panel 18 by fastener 372 and product guide plate 374 is adjustably mounted to side panel 16 by fastener 376. The product guide plates 370 and 374 are adjusted transverse to the direction of movement of the belts depending on the product bag width and desired position of the product bag on the drum 300.

Figure 5A:
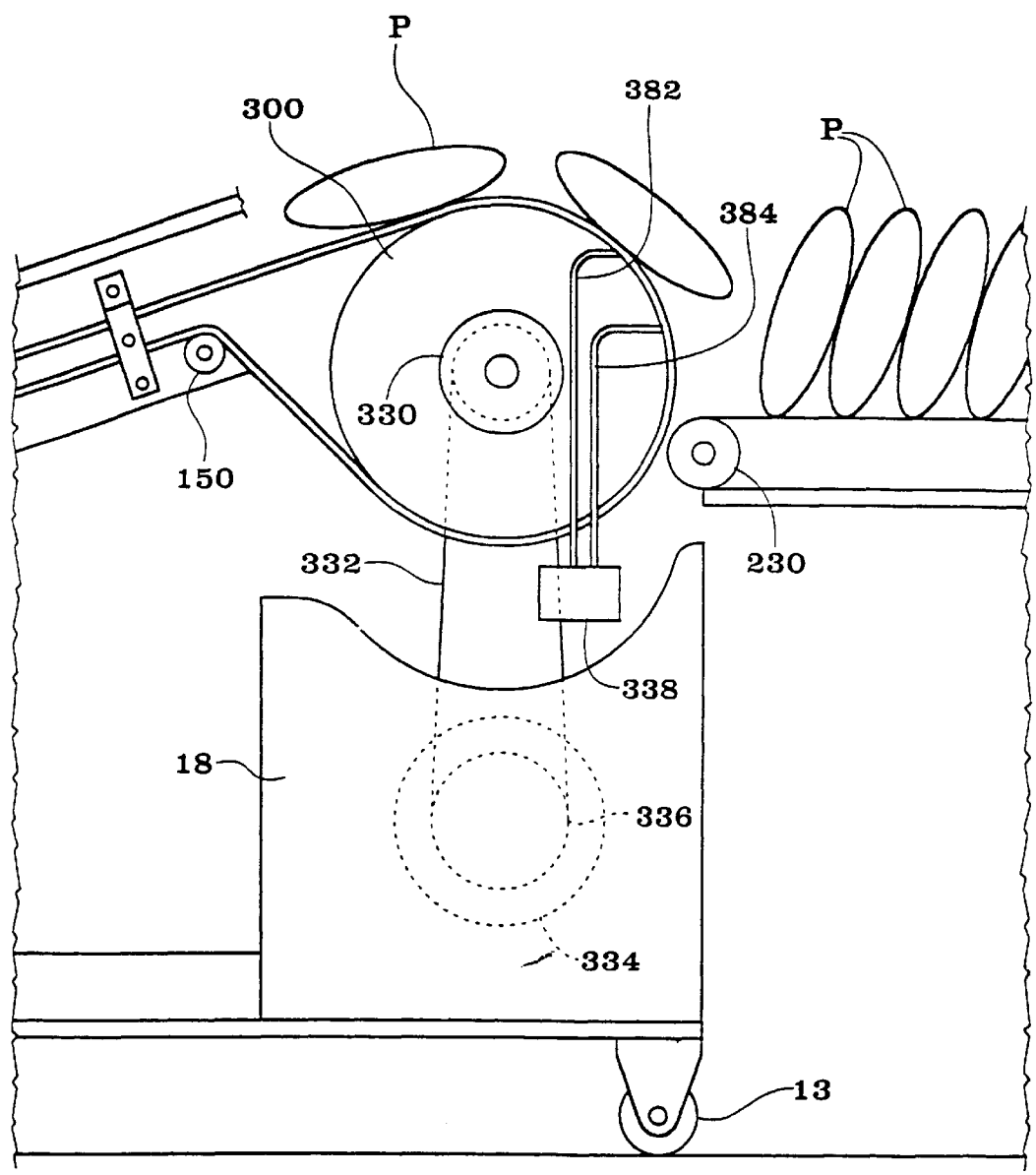
FIG. 5A is an enlargement of a portion of FIG. 5.

Referring to FIGS. 5A and 6, therein is illustrated an upper pair of air nozzles 382 and a lower pair of air nozzles 384 positioned between the rotating disks 342, 343, 344 and 345 of drum 300. Nozzles 382 and 384 are connected to a conventional compressed air source 388. It will be understood by those skilled in the art that any non-corrosive pressurized gas may be used in the practice of the invention. The upper air nozzles 382 are positioned to discharge an air blast that will strike large and extra large size product bags p having heights ranging from 10 to 18 inches. The lower nozzles 384 are positioned to discharge an air blast that will strike small and medium product bags having a height of 4 to 10 inches. The upper nozzles discharge air at 60 psi (FIG. 8A) and the lower nozzles discharge air at 30 psi (FIG. 8B) because the weight of the larger product bags requires more thrust in order to tip the bags received by the second conveyor 200 to a desired 70 degree angle from horizontal.

A sensor 600 indicates when the product bag p is properly positioned to receive the air blast for uprighting the product bag. The sensor 600 includes a light beam source 602 positioned on a first side of the second conveyor, a reflector 604 positioned across from the light source on the second side of the second conveyor and a light beam receiver 606 positioned on the first side of the second conveyor 200. A falling product bag p interrupts the light beam and generates a signal indicating the presence of the product bag. It will be understood that any type of sensor capable of indication of the position of the product bag may be used in the practice of the invention. As is clearly shown in FIG. 4, the light path between the source, the reflector, and the receiver is angular, which allows detection of all bag sizes without adjustment.

Turning now to FIG. 9, therein is illustrated a control panel 410 for the programmable logic controller ("PLC") 400. The panel 410 is provided with an emergency stop switch 412, a variable bag size switch 414, and a variable belt speed switch 416. The bag size switch 414 includes predetermined settings for small, medium, large, extra large, and continuous feed operation. The belt speed switch 416 controls the speed at which the belt 240 on the second conveyor 200 moves when it is activated.

In operation, an operator selects a product bag size setting depending on the height of the product bag. As previously discussed, small bags are typically 4 to 6 inches in height, medium bags are 6 to 10 inches in height, large bags are 10 to 13 inches in height, and extra large and commercial bags are 13 to 18 inches in height. The bag size selector switch 414 signals the PLC to select either the lower or upper nozzles to discharge air when the nozzles are activated. The bag size switch 414 also signals the PLC 400 to select from a pre-programmed set of second conveyor indexing distances. As previously described, the belt 240 of the second conveyor 200 is driven by a DC motor. The DC motor is activated by the PLC 400 for predetermined milliseconds in order for the belt 240 to travel a predetermined distance. The predetermined activation time is set to move the belt 240 (at a preselected speed) approximately 2 inches for a small bag, 3 inches for a medium bag, 4 inches for a large bag, and 5 to 6 inches for an extra large or commercial bag.

The belt speed switch 416 signals the PLC 400 to direct the speed at which the DC motor is run during the milliseconds it is activated. Product density determines the speed at which the belt 240 should run. As previously discussed, denser product packages have narrower bag widths. Therefore in order to achieve proper collation, the belt 240 is driven at a faster speed (generating more incremental distance of travel during the interval of activation) for product packages having greater widths. For example, potato chips require the belt 240 to be run faster than for the more dense and narrower product package containing corn chips.

During operation, the PLC 400 receives a signal from the sensor 600 which indicates when a bag has been received on the second conveyor 200 and is in the proper position to receive an air blast to tip the bag forward. Different products require different air blast durations: small ¼ second; medium ½ second; large ½ second; extra large ¾ second. Toggle switch 415 shown in FIG. 9 increases the air blast duration by ¼ second.

Operation of the collator of the present invention begins with inputting bag size and belt speed data by means of the switches 414 and 416 of FIG. 9. Thereafter, whenever the sensor detects a bag the PLC 400 causes an air blast of proper pressure and duration to be emitted either from nozzle 382 and 384, whereby the bag is collated. If necessary, air blast duration is adjusted by means of the toggle switch 415.

Figure 10:
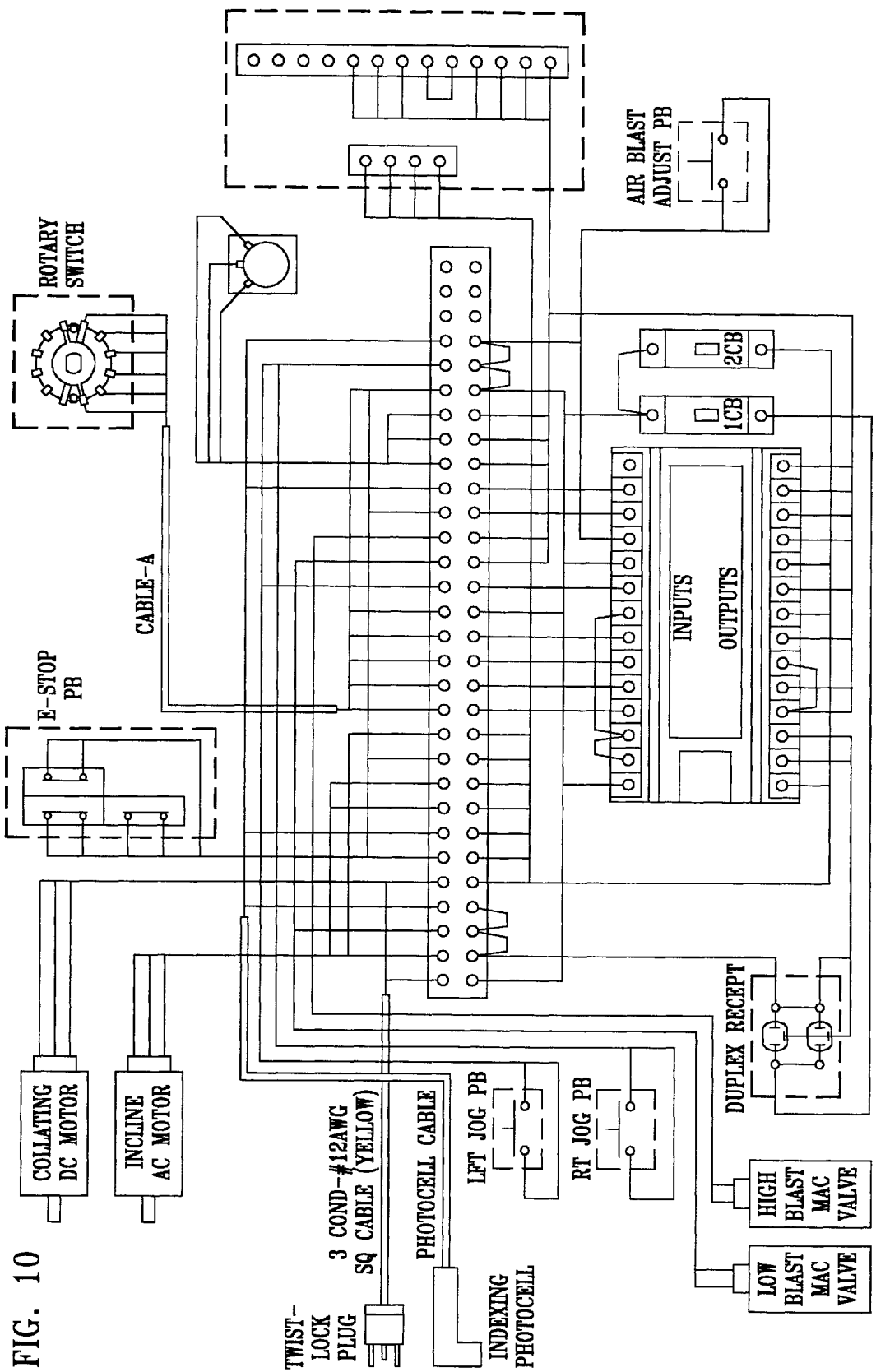
FIG. 10 is a wiring diagram for the collator of the first embodiment of the present invention.
Figure 11A:
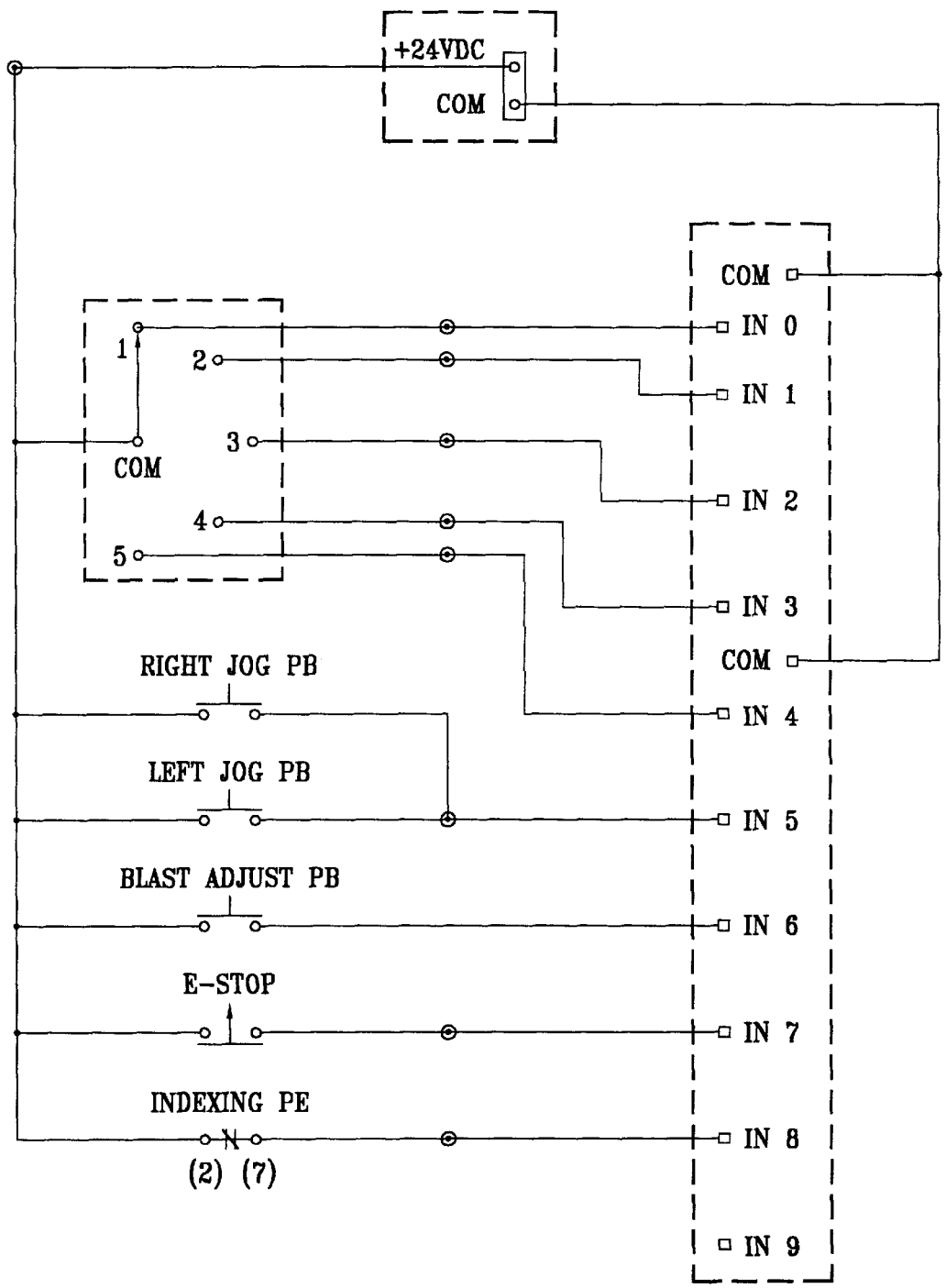
FIG. 11A is a DC wiring schematic for the collator of the first embodiment of the present invention.
Figure 11B:
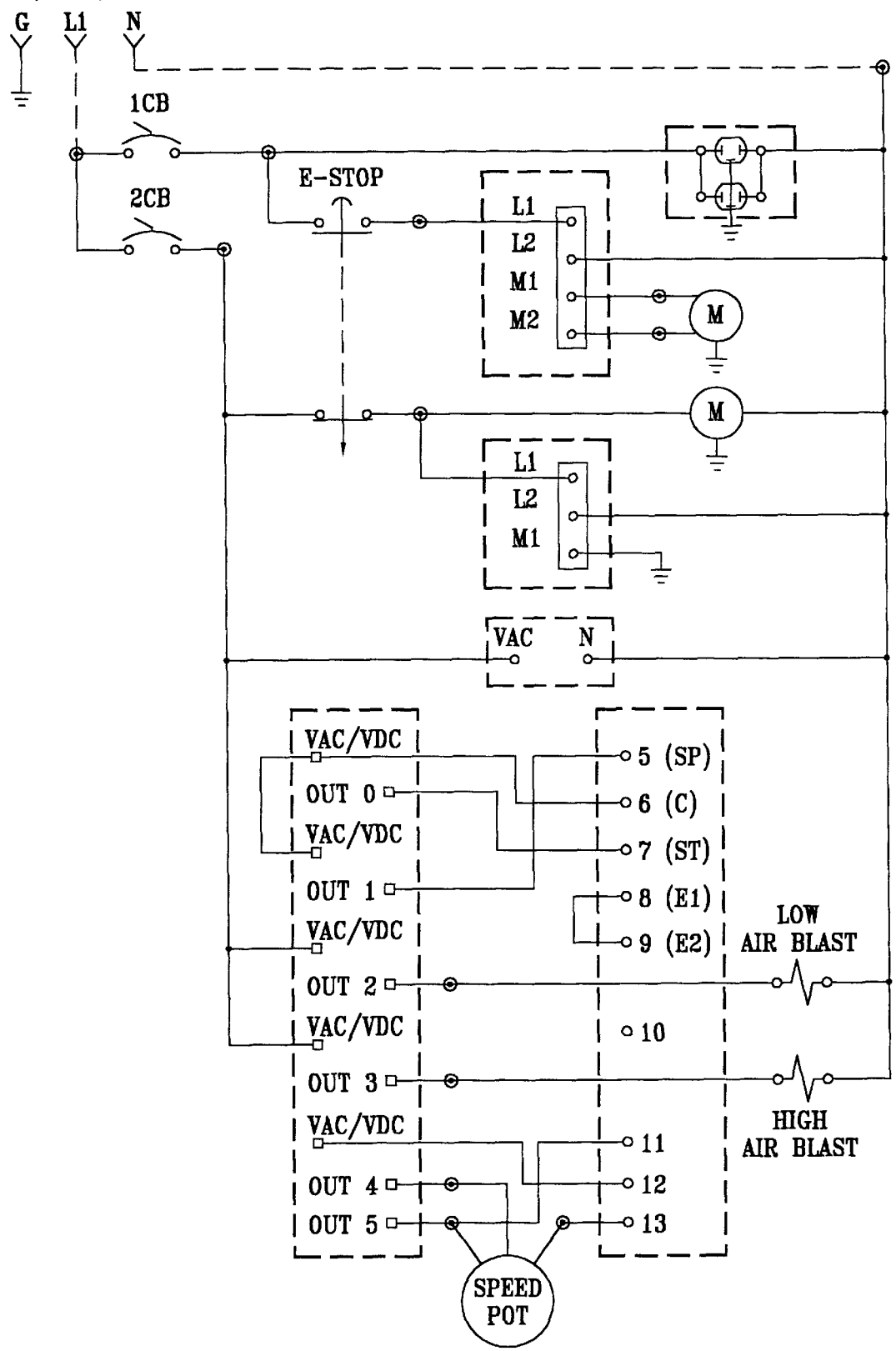
FIG. 11B is a AC wiring schematic for the collator of the first embodiment of the present invention.
Figure 12A:
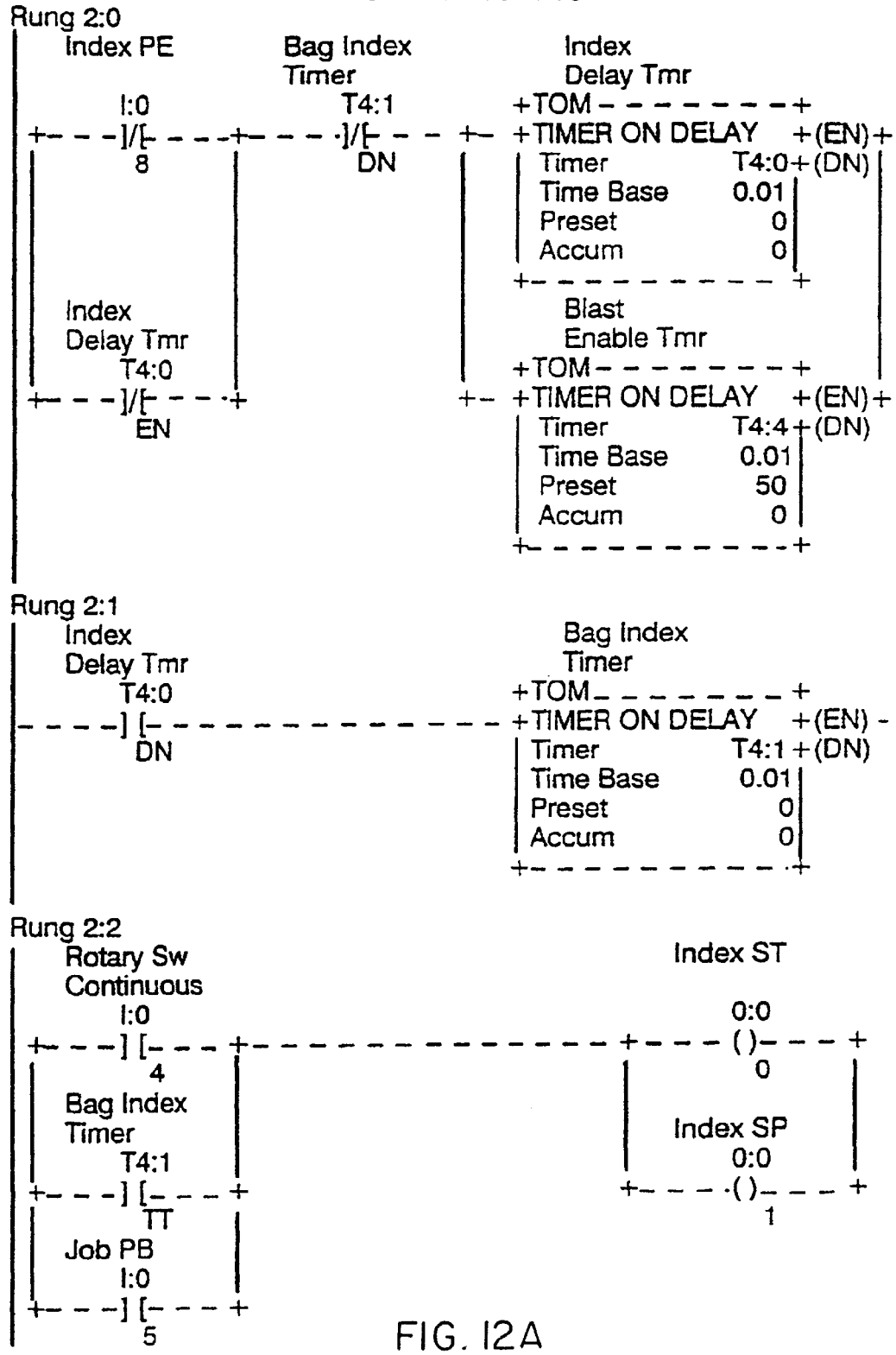

Referring now to FIGS. 10, 11A and 11B, the electrical wiring for the first embodiment of the present invention is illustrated. FIGS. 12A to 12G comprise the program listing for the Programmable Logic Controller (PLC) 400 of the present invention.

FIGS. 13, 14, 15, and 16A through 16S, inclusive, and 17A through 17F, inclusive, illustrate a collator 700 comprising a second embodiment of the invention. Many of the component parts of the collator 700 are substantially identical in construction and function to the component parts of the collator 10 illustrated in FIGS. 1 through 12A–G, inclusive, and described hereinabove in conjunction therewith. Such component parts are designated in FIGS. 13 through 17A–F, inclusive, with the same reference numerals utilized in the description of the first embodiment of the invention, but are differentiated thereof by means of a prime (') designation.

The conveyor 200' of the collator 700 is driven by a two speed motor. The sensor 600' detects each product bag P as it falls onto the conveyor 200'. The output of the sensor 600' is directed to the programmable logic controller 400'.

The collator 700 is adapted for utilization in two different modes. Referring to FIG. 14, when operating in the first mode, the product bags P are accumulated in groups G on the conveyor 200. Each group G contains an identical number of product bags P. This allows the operator to transfer groups G comprising identical numbers of product bags P to cartons or other containers without bothering to count the product bags prior to transfer.

In the operation of the collator 700 in the first mode, the conveyor 200' is normally operated in its slow speed which is coordinated with the rate at which product bags are received on the conveyor 200' such that the product bags P are positioned in an abutting relationship on the conveyor 200'. The output signals from the sensor 600' are accumulated in the programmable logic controller 400' until the desired number of bags comprising each group G h as been reached. When a particular group G has been filled with a desired number of product bags P, the programmable logic controller 400' operates the conveyor 200' at its high speed for a predetermined period of time. In this manner a gap of predetermined length is established between the last product bag P in a first group G and the first product bag P in the next succeeding group G.

In its second operational mode, the collator 700 is provided with a deflector 710 mounted at the distal end of the conveyor 200'. The deflector 710 is operated by an electrical solenoid, a pneumatic cylinder, a hydraulic cylinder, etc. operating through a conventional lever mechanism. Although the deflector 710 is shown positioned horizontally in FIG. 13, such positioning is not within the normal operating parameters of the deflector 710.

Figure 15:
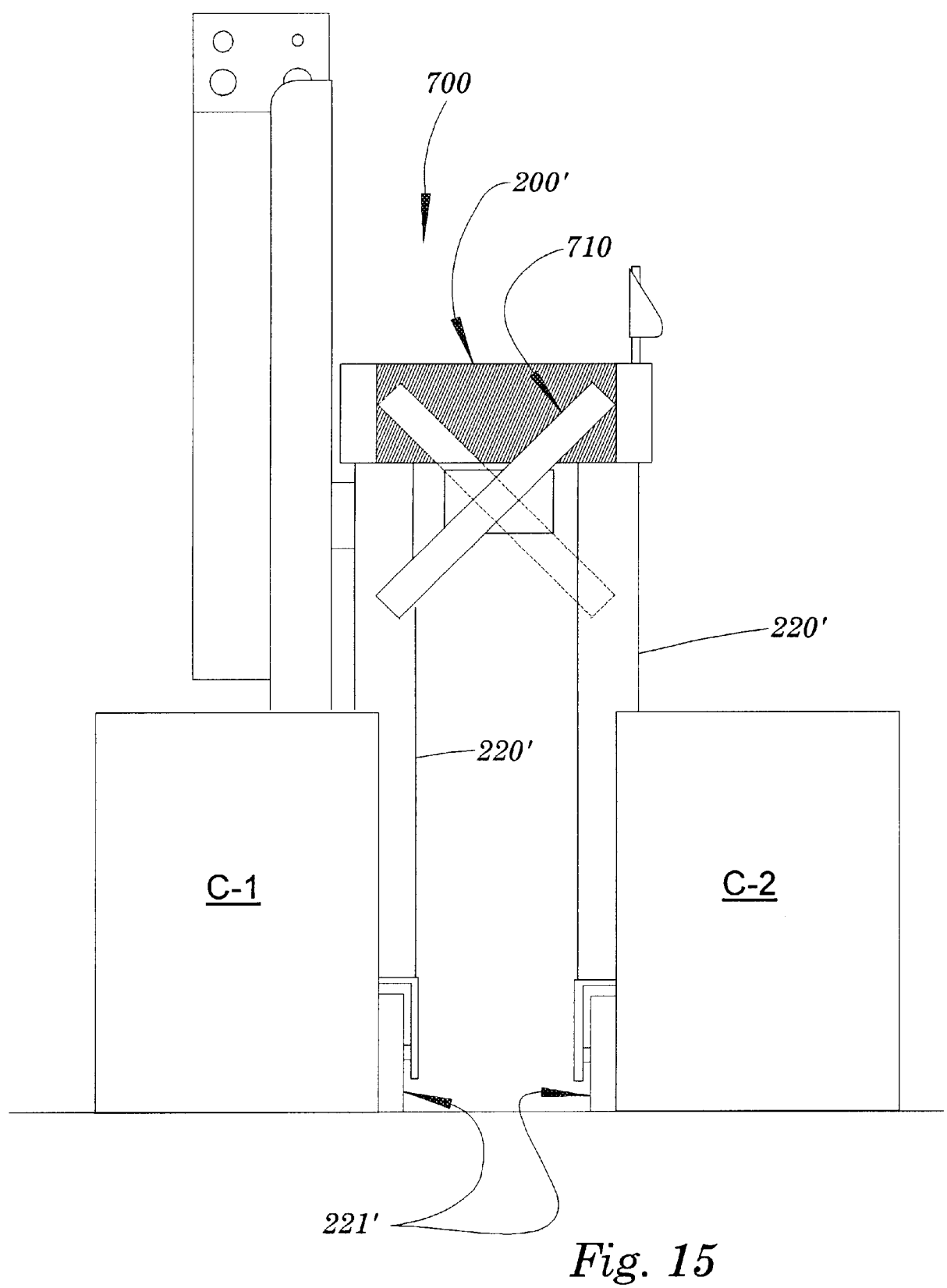
FIG. 15 is an end view of the embodiment of the invention shown in FIG. 13.
Figure 17A:
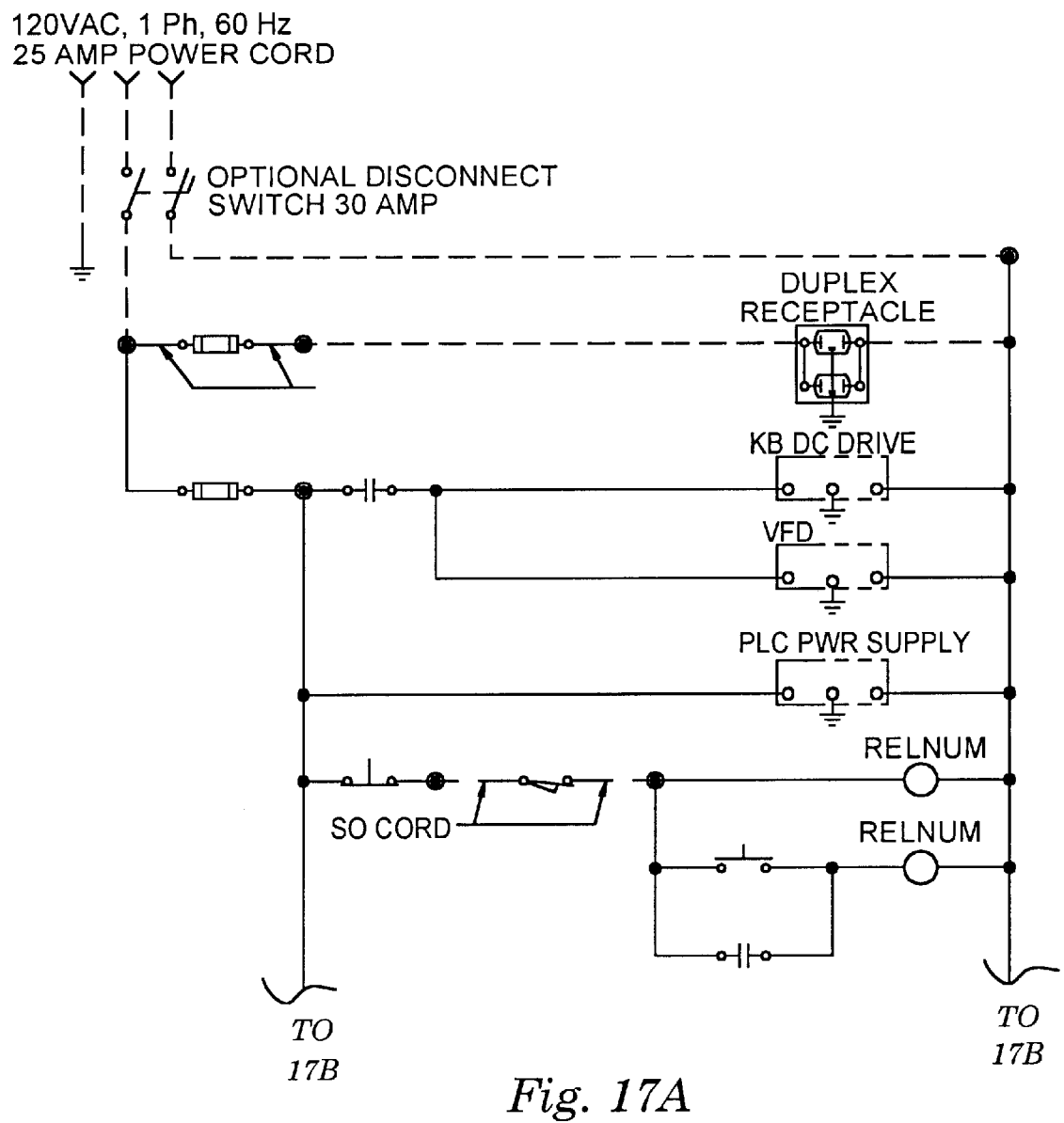
FIGS. 17A through 17F comprise the electrical wiring diagram for the second embodiment of the invention.
Figure 17B:
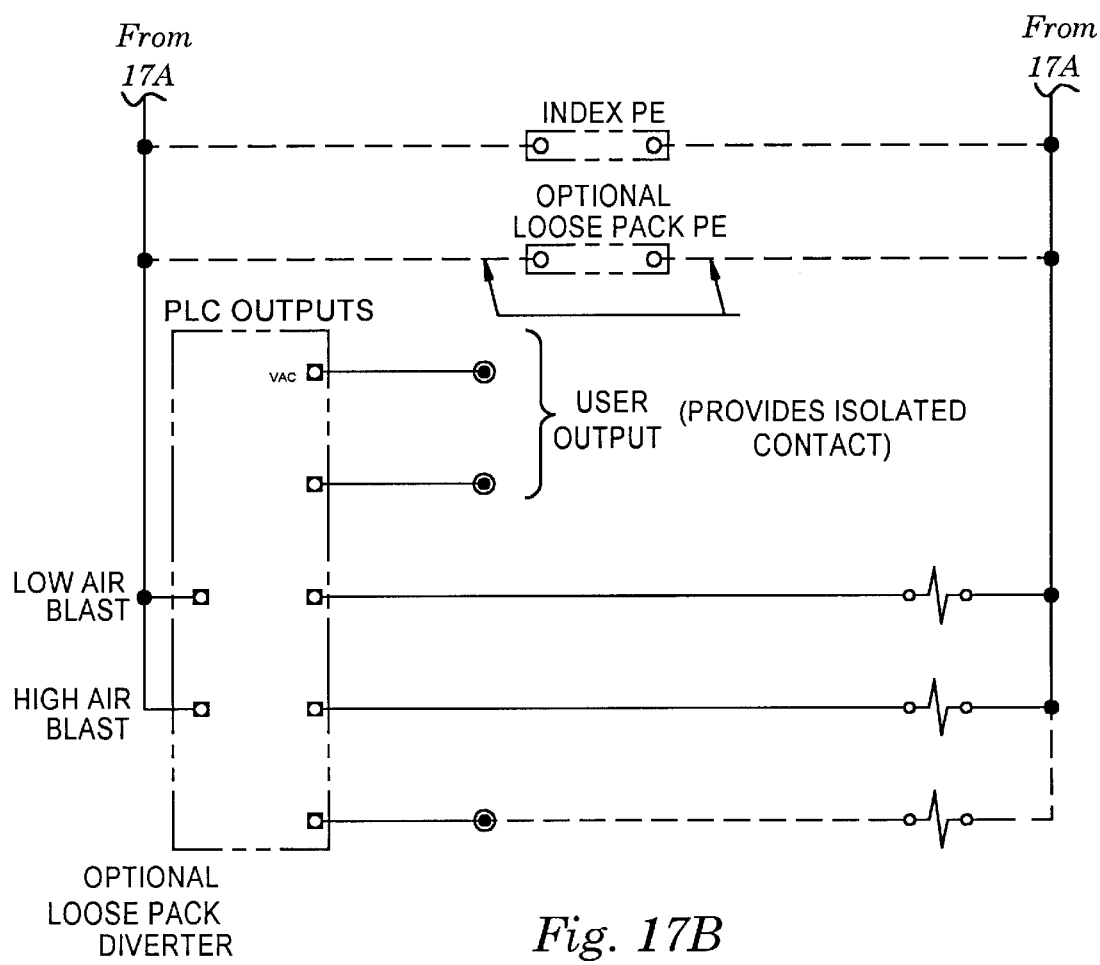
Figure 17C:
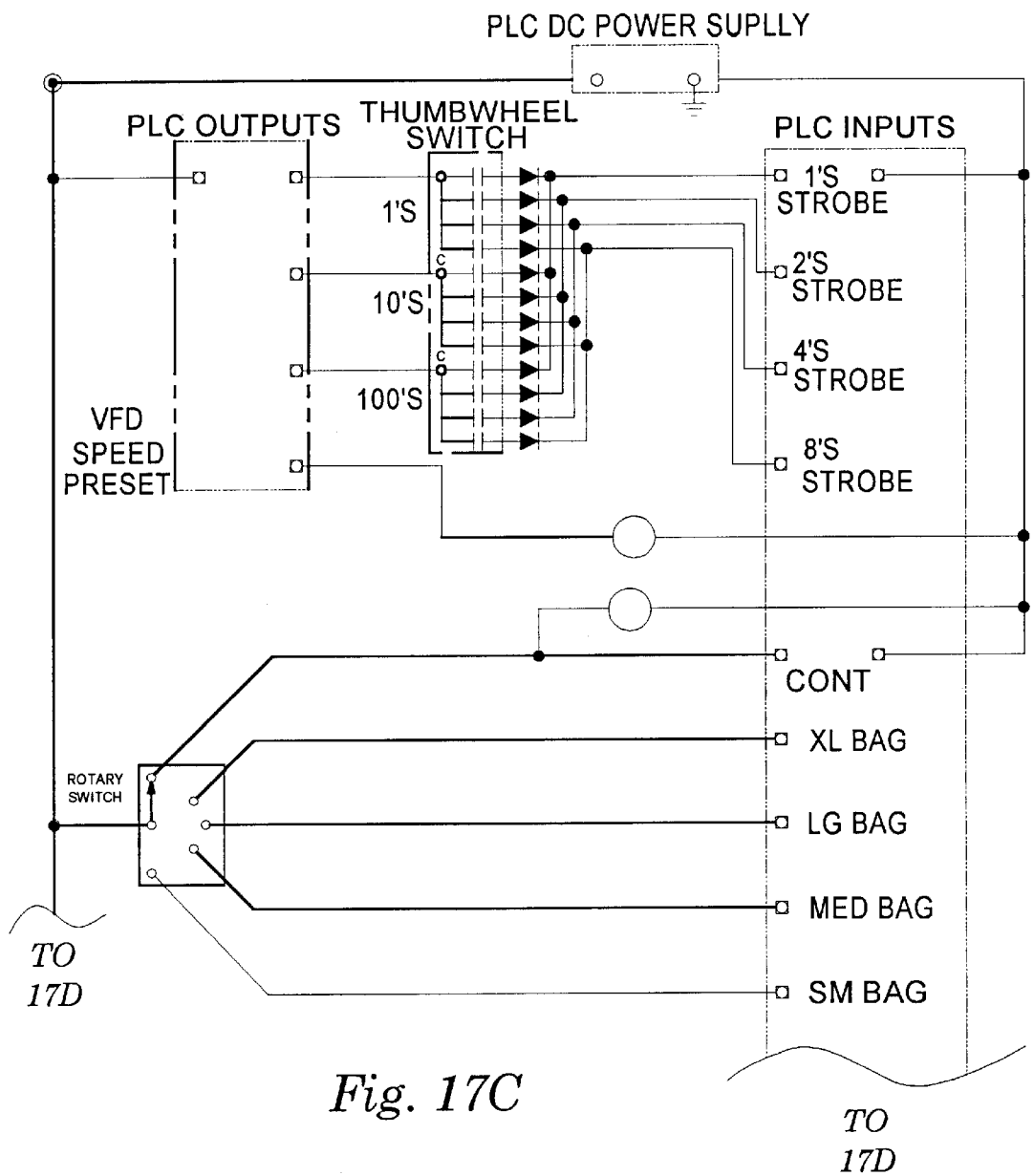
Figure 17D:
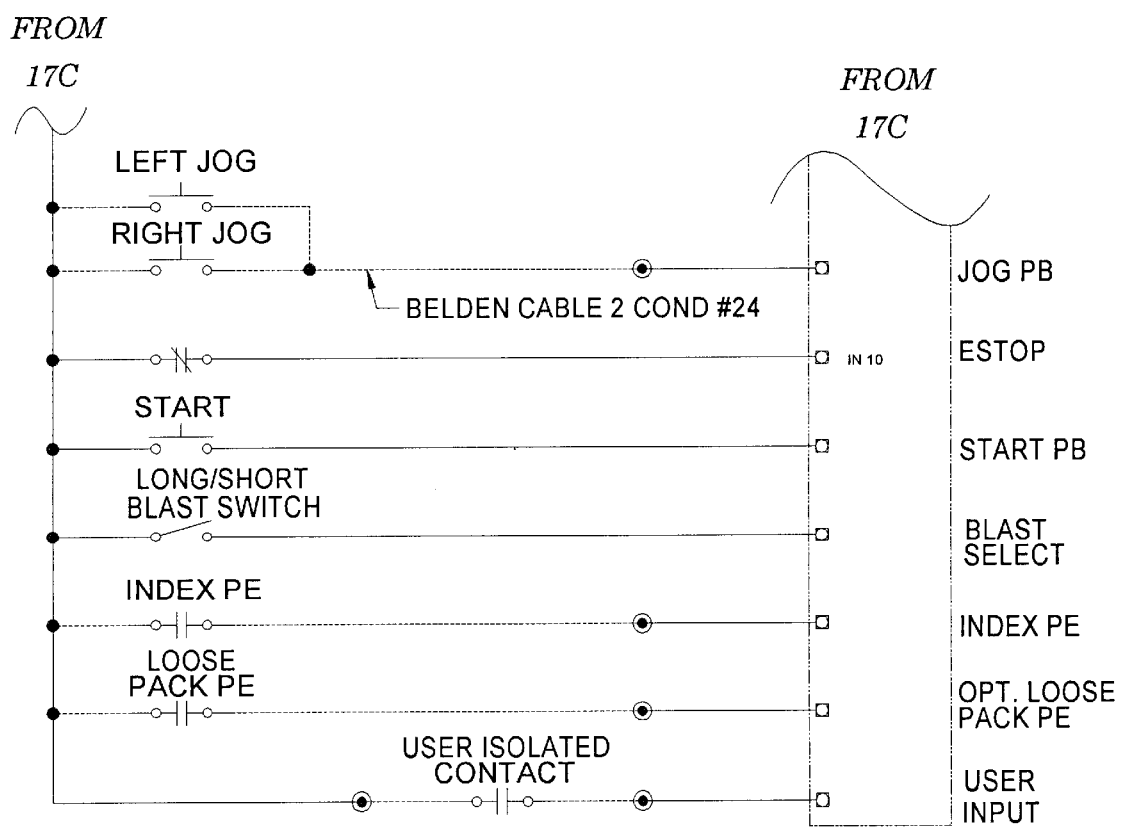
Figure 17E:
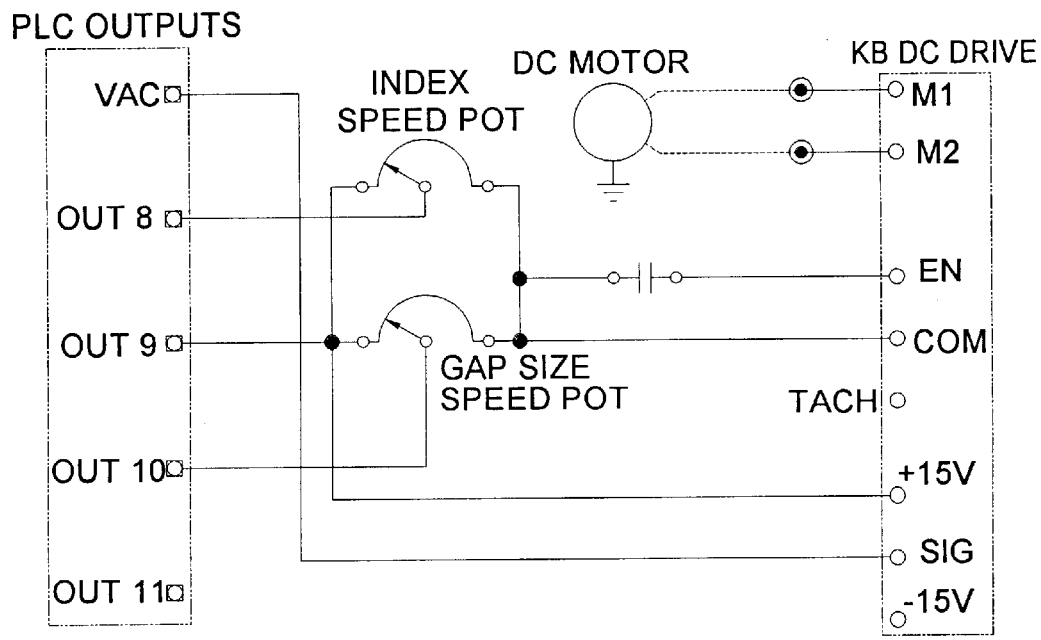
Figure 17F:
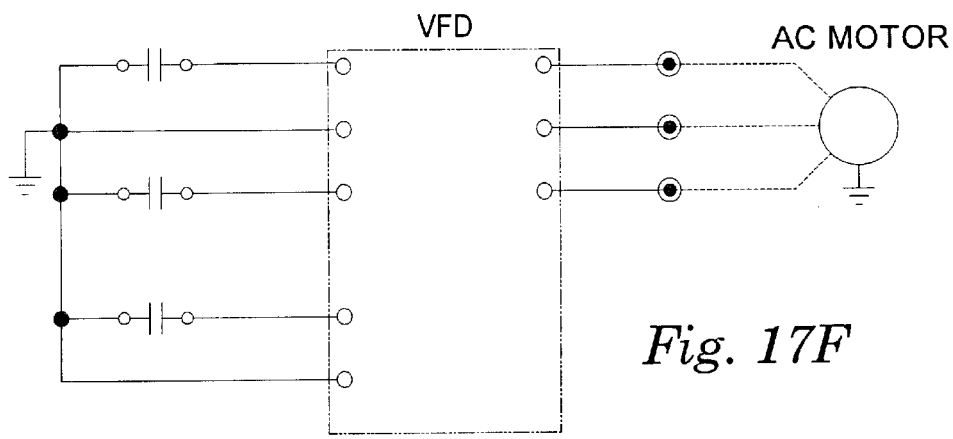

Referring to FIG. 15, the deflector 710 is initially positioned as illustrated in full lines. When so positioned, the deflector 710 directs product bags discharged from the conveyor 200' into a first container C-1. The positioning of the deflector 710 continues until the programmable logic controller 400' has received output signals from the sensor 600' indicating that a predetermined number of product packages have been discharged into the container C-1.

When the predetermined number of product bags have been discharged into the container C-1, the positioning of the deflector 710 is changed from the position shown in full lines in FIG. 15 to the position shown in dashed lines therein. Thereafter the deflector 710 directs product bags discharged from the conveyor 200' into the container C-2. During discharge of the product bags into the container C-2 the operator removes the now full container C-1 and replaces the container C-1 with an empty container. The discharge of product bags into the container C-2 continues until the programmable logic controller 400' receives output signals from the sensor 600' indicating that a predetermined number of product bags have been discharged into the container C-2. At that point, the positioning of the deflector 710 is reversed and the foregoing cycle is repeated.

A more complete understanding of the operation of the collator 700 may be had by reference to FIGS. 17A–17F, inclusive, wherein the wiring diagram of the collator 700 is illustrated, and to FIGS. 16A–16S, inclusive, wherein the computer program contained within the programmable logic controller 400' is illustrated.

Although preferred embodiments of the present invention have been illustrated in the accompanying Drawings and described in the foregoing Detailed Description, it will be understood that the invention is not limited to the embodiments disclosed but is capable of numerous rearrangements, modifications and substitutions of parts and elements without departing from the spirit of the invention.

I claim:

1. An apparatus for alternatively filling containers with bagged food products comprising:

a frame defining a horizontal plane and a path of travel;

a bagged food product receiving conveyor having a receiving end and a discharge end for sequentially receiving a series of bagged food products at the receiving end, for transporting the received bagged food products across the horizontal plane and along the path of travel, and sequentially discharging the bagged food products from the discharge end;

first and second bagged food product receiving containers positioned at the discharge end of the bagged food product receiving conveyor on opposite sides of the path of travel and substantially below the horizontal plane;

a deflector mounted at the discharge end of the receiving conveyor for transversely deflecting bagged food products discharged therefrom with respect to the path path of travel;

supporting means for supporting the deflector for pivotal movement about a substantially horizontally disposed axis located below the horizontal plane and extending between the first and second containers and parallel to the path of travel; and positioning means for initially positioning the deflector on the horizontal axis in a first orientation wherein the deflector extends angularly downwardly relative to the receiving conveyor toward the first container so that bagged food products discharged from the discharge end of the receiving conveyor engage the deflector and are deflected thereby into the first container until a predetermined number of bagged food products have been deflected into the first container and for thereupon pivoting the deflector about the horizontal axis into a second orientation wherein the deflector extends angularly downwardly relative to the receiving conveyor toward the second container so that bagged food products discharged from the discharge end of the receiving container engage the deflector and are deflected thereby into the second container until a predetermined number of bagged food products have been deflected into the second container.

2. The apparatus according to claim 1 further including counting means for counting the number of bagged food products that is discharged into each container and for activating the positioning means to change the orientation of the deflector when one of the containers has received a predetermined number of bagged food products.

* * * * *